United States Patent [19]
Kaufman et al.

[11] Patent Number: 5,313,647
[45] Date of Patent: May 17, 1994

[54] DIGITAL DATA PROCESSOR WITH IMPROVED CHECKPOINTING AND FORKING

[75] Inventors: Mark A. Kaufman, Brighton; Fernando Oliveira, Framingham, both of Mass.

[73] Assignee: Kendall Square Research Corporation, Waltham, Mass.

[21] Appl. No.: 763,505

[22] Filed: Sep. 20, 1991

[51] Int. Cl.$^5$ ............................................. G06F 9/46
[52] U.S. Cl. ............................. 395/700; 364/DIG. 1; 364/261.9; 364/281.3
[58] Field of Search .................. 395/700; 364/DIG. 1

[56] References Cited

U.S. PATENT DOCUMENTS

| | | | |
|---|---|---|---|
| 3,723,976 | 3/1973 | Alvarez et al. | 364/DIG. 1 |
| 4,358,823 | 11/1982 | McDonald et al. | 364/DIG. 1 |
| 4,468,733 | 8/1984 | Oka et al. | 364/DIG. 1 |
| 4,497,023 | 1/1985 | Moorer | 395/775 |
| 4,622,631 | 11/1986 | Frank et al. | 364/DIG. 1 |
| 4,714,990 | 12/1987 | Desyllas et al. | 364/DIG. 1 |
| 4,758,946 | 7/1988 | Shar et al. | 364/DIG. 1 |
| 4,780,873 | 10/1988 | Mattheyses | |
| 4,792,895 | 12/1988 | Tallman | 364/DIG. 1 |
| 4,864,495 | 9/1989 | Inaba | 364/DIG. 1 |
| 4,888,726 | 12/1989 | Struger et al. | 364/DIG. 2 |
| 4,972,338 | 12/1990 | Crawford | 364/DIG. 1 |
| 4,980,816 | 12/1990 | Fukuzawa et al. | 364/DIG. 1 |
| 5,025,366 | 6/1991 | Baror | 364/DIG. 1 |
| 5,055,999 | 10/1991 | Frank et al. | 364/DIG. 1 |
| 5,060,186 | 10/1991 | Barbagelata et al. | 364/DIG. 1 |
| 5,101,402 | 3/1992 | Chiu et al. | 370/17 |
| 5,119,481 | 6/1992 | Frank et al. | 395/325 |

FOREIGN PATENT DOCUMENTS

| | | |
|---|---|---|
| 0233993 | 9/1987 | European Pat. Off. . |
| 0262750 | 4/1988 | European Pat. Off. . |
| 0322117 | 6/1989 | European Pat. Off. . |
| 0404559 | 12/1990 | European Pat. Off. . |
| 0404560 | 12/1990 | European Pat. Off. . |
| 2176918 | 1/1987 | United Kingdom . |
| 8808652 | 11/1988 | World Int. Prop. O. . |

OTHER PUBLICATIONS

Uffenbeck, "Microcomputers and Microprocessors" (Prentice Hall, 1985), Sec. 6.5–7.4, pp. 257–332.
Proc. of the 6th Annual Phoenix Conf. on Computer and Communications, Feb. 25–27, 1987, pp. 14–17.

Primary Examiner—Thomas M. Heckler
Attorney, Agent, or Firm—Lahive & Cockfield

[57] ABSTRACT

A digital data processing apparatus includes a processing element that executes a process for generating requests for access to mapped data in a memory element. The apparatus also includes a fork/checkpoint-signalling element that generates "new-process signals" which delineate new time intervals. The apparatus responds to data requests generated by the process before the first new-process signal by accessing a requested datum as stored in a first set in memory. An address space manager responds to certain requests, e.g., for write access, in subsequent intervals for copying the requested datum from the most recent set in which it is stored to the current interval and, thereafter, accessing that copy. The manager responds to other requests, e.g., those for read-type access, by accessing the requested datum in the most recent set in which it is stored. A fork element can create a second process that initially duplicates a first one and can initiate generation of a new-process signal in connection with creation of the second process.

44 Claims, 17 Drawing Sheets

DIGITAL DATA PROCESSOR WITH IMPROVED CHECKPOINTING AND FORKING

REFERENCE TO RELATED APPLICATIONS

This application is related to the following co-pending and commonly assigned applications, the teachings of which are incorporated herein by reference:

1) U.S. patent application Ser. No. 136,930, filed Dec. 22, 1987, for "MULTIPROCESSOR DIGITAL DATA PROCESSING SYSTEM", now U.S. Pat. No. 5,055,999.

2) U.S. patent application Ser. No. 696,291, filed May 20, 1991, for "INTERCONNECTION SYSTEM FOR MULTIPROCESSOR STRUCTURE," now U.S. Pat. No. 5,119,481;

3) U.S. patent application No. 370,325 filed Jun. 22, 1989, for "MULTIPROCESSOR SYSTEM WITH MULTIPLE INSTRUCTION SOURCES";

4) U.S. patent application No. 370,341 filed Jun. 22, 1989, for "IMPROVED MEMORY SYSTEM FOR A MULTIPROCESSOR";

5) U.S. patent application No. 370,287 filed Jun. 22, 1989, for "IMPROVED MULTIPROCESSOR SYSTEM";

6) U.S. patent application No. 499,182 filed Mar. 26, 1990, for "HIGH-SPEED PACKET SWITCHING APPARATUS AND METHOD";

7) U.S. patent application No. 521,798 filed May 10, 1990, for "DYNAMIC PACKET ROUTING NETWORK";

8) U.S. patent application No. 526,396 filed May 18, 1990, for "PACKET ROUTING SWITCH";

9) U.S. patent application No. 531,506 filed May 31, 1990, for "DYNAMIC HIERARCHICAL ASSOCIATIVE MEMORY";

10) U.S. patent application No. 763,507 filed this day herewith, Sep. 20, 1991 for "PARALLEL PROCESSING APPARATUS AND METHOD UTILIZING TILING;"

11) U.S. patent application No. 763,368 filed this day herewith, Sep. 20, 1991, for "DIGITAL DATA PROCESSOR WITH IMPROVED PAGING;" and 12) U.S. patent application No. 763,132 filed this day herewith, Sep. 20, 1991 for "IMPROVED DIGITAL DATA PROCESSOR WITH DISTRIBUTED MEMORY SYSTEMS".

BACKGROUND OF THE INVENTION

The invention relates to digital data processing and, more particularly, to improved methods and apparatus for handling process checkpoints and forks.

When running a program on a computer it is often desirable to take a snapshot, or "checkpoint," of the program. That is, to record values of program variables, counters and system parameters so that the program can later be restarted, just as if it were running from the time of the checkpoint. Such a snapshot can be helpful, for example, in restarting a process that terminates abnormally.

In many conventional computer systems, upon taking a checkpoint the entire process—i.e., the values of all registers and data associated with an executing program—is stored to disk, or other secondary storage device. This can prove costly, both with respect to time and secondary data storage space.

Heretofore unrelated to checkpointing many computer systems, for example, those running under UNIX or UNIX-like operating systems, permit process duplication, or forking. Forking causes one process to replicate, spawning a new process. The first process, referred to as the parent, continues in the normal manner after the fork. The spawned process, or child, though initially identical to the parent, can be executed in a different manner.

In creating a child process, a conventional computer system copies the entire memory space of the parent into that of the child. Where the parent's process space is large, this can prove costly from a memory allocation standpoint.

In view of the foregoing, an object of the invention is to provide an improved digital data processing system and method.

More particularly, an object of the invention is to provide a digital data processing mechanism which minimizes the cost associated with checkpointing and forking.

Another object of the invention is to provide a method and apparatus for creating forks and checkpoints which best utilizes system resources.

Still another object is to provide improved mechanisms for forking and checkpointing useful within computer systems running UNIX or UNIX-like operating systems.

SUMMARY OF THE INVENTION

The aforementioned objects are attained by the invention which provides, in one aspect, a digital data processing apparatus including a memory (e.g., a RAM) and a processing element (e.g., a CPU) that executes a process and generates requests for access to mapped data in the memory. A fork/checkpoint signalling element generates "new-process signals," each delineating a new time interval.

The apparatus responds to data requests generated by the process before the first new-process signal by accessing the requested datum as stored in a first set in memory. An address space manager responds to certain requests, e.g., for write access, in subsequent intervals for copying the requested datum from the most recent set in which it is stored to the current interval and, thereafter, accessing that copy. The manager responds to other requests, e.g., those for read-type access, by accessing the requested datum in the most recent set in which it is stored.

In one aspect, after the first request for write-type access, the address space manager copies each requested datum—regardless of whether it is for read or write access—to the current set.

In another aspect, the process generates along with each access request, a context address of the requested datum. The address space manager includes a segment translation table, or STT, for generating a storage descriptor corresponding to that context address. The storage descriptor can describe, for example, the actual address of the requested datum in memory or, for paged data, on a disk file.

The STT can have one or more entries, or STTE's, each storing signals representing the association between at least one context address and at least one storage descriptor.

In another aspect, the address space manager includes a data structure, referred to as an object table, for storing information on the status of each process during corresponding time intervals. This information includes translation information, which can be transferred from the STT to the object, for example, after each new-process signal. Preferable, the address space manager waits for a write-type access subsequent to the new-process signal for performing such a transfer.

The address space manager utilizes multiple objects within the object table to track the status of the process during respective prior intervals. These objects can be linked in an order based on the sequence of the intervals themselves.

Following issuance of a new-process signal, the address space manager modifies the STT so that each entry points to an empty area in a current set. Thus, an attempt to access data within the range of any entry will result in a "missing" data fault. The address space manager responds to such a fault by accessing prior objects to find the one associated with an interval in which requested data was last accessed. Once found, the manager access the data and copies it to the current set, while updating the corresponding STT entry.

Another aspect of the invention provides an element for restoring the process to a state associated with a prior interval by transferring translation signals from a selected object to the STT.

Like other information in memory, an apparatus according to the invention can page the objects to disk. However, unlike at least other process-related information which is only temporarily stored on disk, the paged objects can be retained for long periods.

A digital data processor of the type described above can automatically generate a new-process signals, for example, at selected times or in response to programming operations. In addition, those signals can be generated in response to user requests.

A digital data processor according to the invention can include a fork element for creating a second process that initially duplicates a first one. According to this aspect, the fork element initiates generation of a new-process signal in connection with creation of the second process.

As above, an address space manager for that process responds to certain requests by that process during intervals subsequent to the fork for copying the requested datum from the most recent set in which it is stored to a set associated with that interval of operation of the second process. The manager can respond to other requests, e.g., those for read-type access, by accessing the requested datum in the most recent set in which it is stored.

Also as above, in one aspect, after the first request for write-type access, the address space manager can copy each requested datum—regardless of whether it is for read or write access—to the current set.

In still other aspects, the invention provides methods for operating a digital data processor of the type described above.

These and other aspects of the invention are evident in the attached drawings and in the description which follows.

BRIEF DESCRIPTION OF THE DRAWINGS

A more complete understanding of the invention may be attained by reference to the drawings, in which:

FIG. 19, Sheets 1–3, depict a preferred sequence of steps of VM PAGE IN.

DETAILED DESCRIPTION OF THE ILLUSTRATED EMBODIMENT

Figure 1:
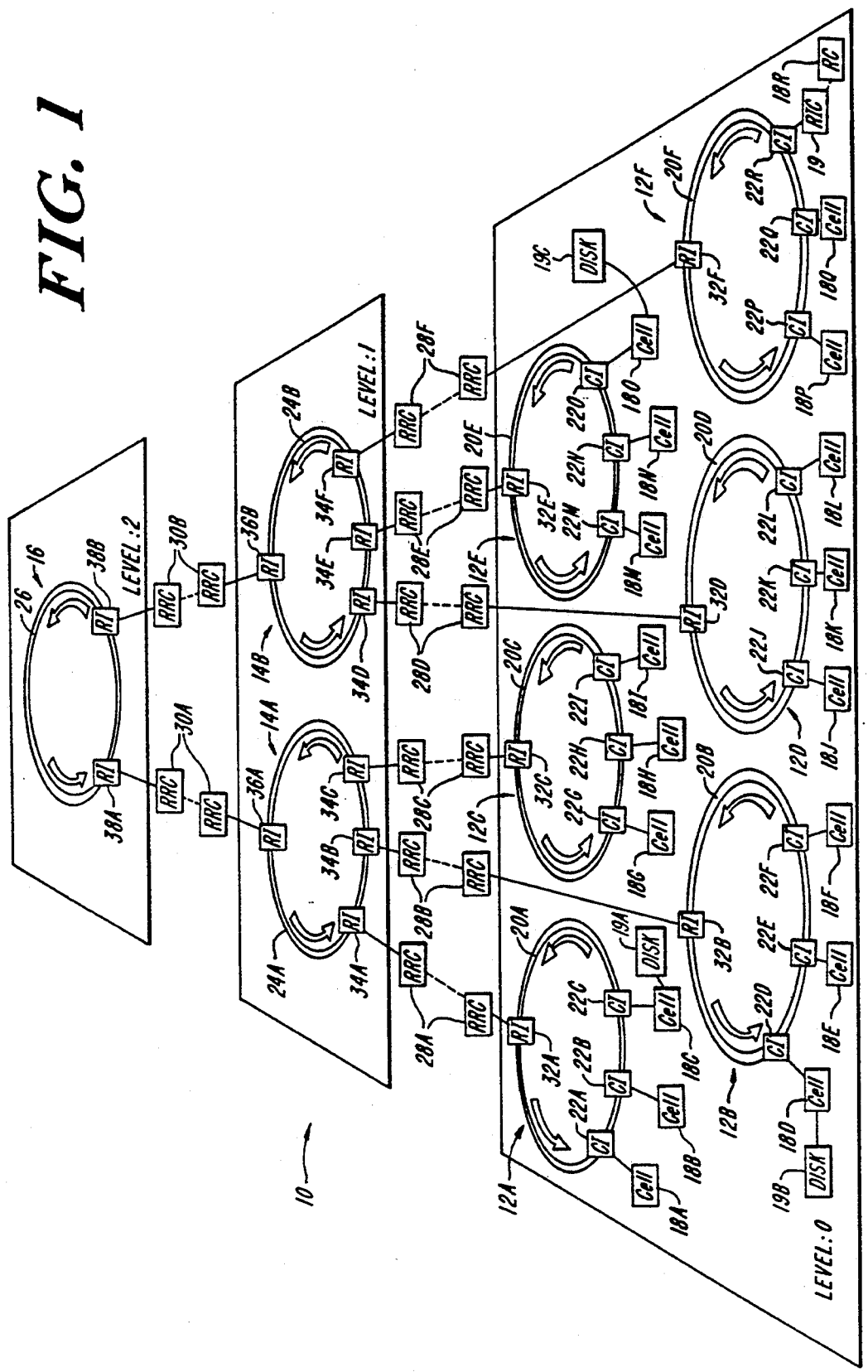
FIG. 1 depicts the structure of a multiprocessing system for use in a preferred practice of the invention.

FIG. 1 depicts a preferred multiprocessing system used to practice the invention. The illustrated system 10 includes three information transfer levels: level:0, level:1, and level:2. Each information transfer level includes one or more level segments, characterized by a bus element and a plurality of interface elements. Particularly, level:0 of the illustrated system 10 includes six segments, designated 12A, 12B, 12C, 12D, 12E and 12F, respectively. Similarly, level:1 includes segments 14A and 14B, while level:2 includes segment 16.

Each segment of level:0, i.e., segments 12A, 12B, ... 12F, comprise a plurality of processing cells. For example, segment 12A includes cells 18A, 18B and 18C; segment 12B includes cells 18D, 18E and 18F; and so forth. Each of those cells include a central processing unit and a memory element, interconnected along an intracellular processor bus (not shown). In accord with the preferred practice of the invention, the memory element contained in each cells stores all control and data signals used by its associated central processing unit.

Certain cells of the processing system 10 are connected to secondary storage devices. In the illustrated system, for example, cell 18C is coupled with disk drive 19A, cell 18D is coupled with disk drive 19B, and cell 180 is coupled with disk drive 19C. The disk drives 19A–19C are of conventional design and can be selected from any of several commercially available devices. It will be appreciated that secondary storage devices other than disk drives, e.g., tape drives, can also be used to store information.

As further illustrated, each level 0 segment may be characterized as having a bus element providing a communication pathway for transferring information packets between the cells of the segment. Thus, illustrated segment 12A is characterized by bus 20A, segment 12B by 20B, segment 12C by 20C, et cetera. As described in greater detail below, digital information packets are passed between the cells 18A, 18B and 18C of exemplary segment 12A by way of the memory elements associated with each of those cells. Specific interfaces between those memory elements and the bus 20A are provided by cell interface units 22A, 22B and 22C, as shown. Similar direct communication pathways are established in segments 12B, 12C and 12D between their respective cells 18D, 18E ... 18R by cell interface units 22D, 22E, ... 22R, as illustrated.

As shown in the illustration and noted above, the remaining information transfer levels, i.e., level:1 and level:2, each include one or more corresponding level segments. The number of segments in each successive segment being less than the number of segments in the prior one. Thus, level:1's two segments 14A and 14B number fewer than level:0's six 12A, 12B ... 12F, while level:2, having only segment 16, includes the fewest of all. Each of the segments in level:1 and level:2, the "higher" levels, include a bus element for transferring packets within the respective segments. In the illustration, level:1 segments 14A and 14B include bus elements 24A and 24B, respectively, while level:2 segment 16 includes bus element 26.

The routing cells themselves provide a mechanism for transferring information between associated segments of successive levels. Routing cells 28A, 28B and 28C, for example, provide a means for transferring information to and from level 1 segment 14A and each of level:0 segments 12A, 12B and 12C, respectively. Similarly, routing cells 28D, 28E and 28F provide a means for transferring information to and from level:1 segment 14B and each of level:0 segments 12D, 12E and 12F, respectively. Further, routing cells 30A and 30B provide an information transfer pathway between level 2 segment 16 and level:1 segments 14A and 14B, as shown.

The routing cells interface their respective segments via interconnections at the bus elements. Thus, routing cell 28A interfaces bus elements 20A and 24A at ring interconnects 32A and 34A, respectively, while element 28B interfaces bus elements 20B and 24B at ring interconnects 32B and 34B, respectively, and so forth. Similarly, routing cells 30A and 30B interface their respective buses, i.e., 24A, 24B and 26, at ring interconnects 36A, 36B, 38A and 38B, as shown.

Data Movement & Coherency

Figure 2A:
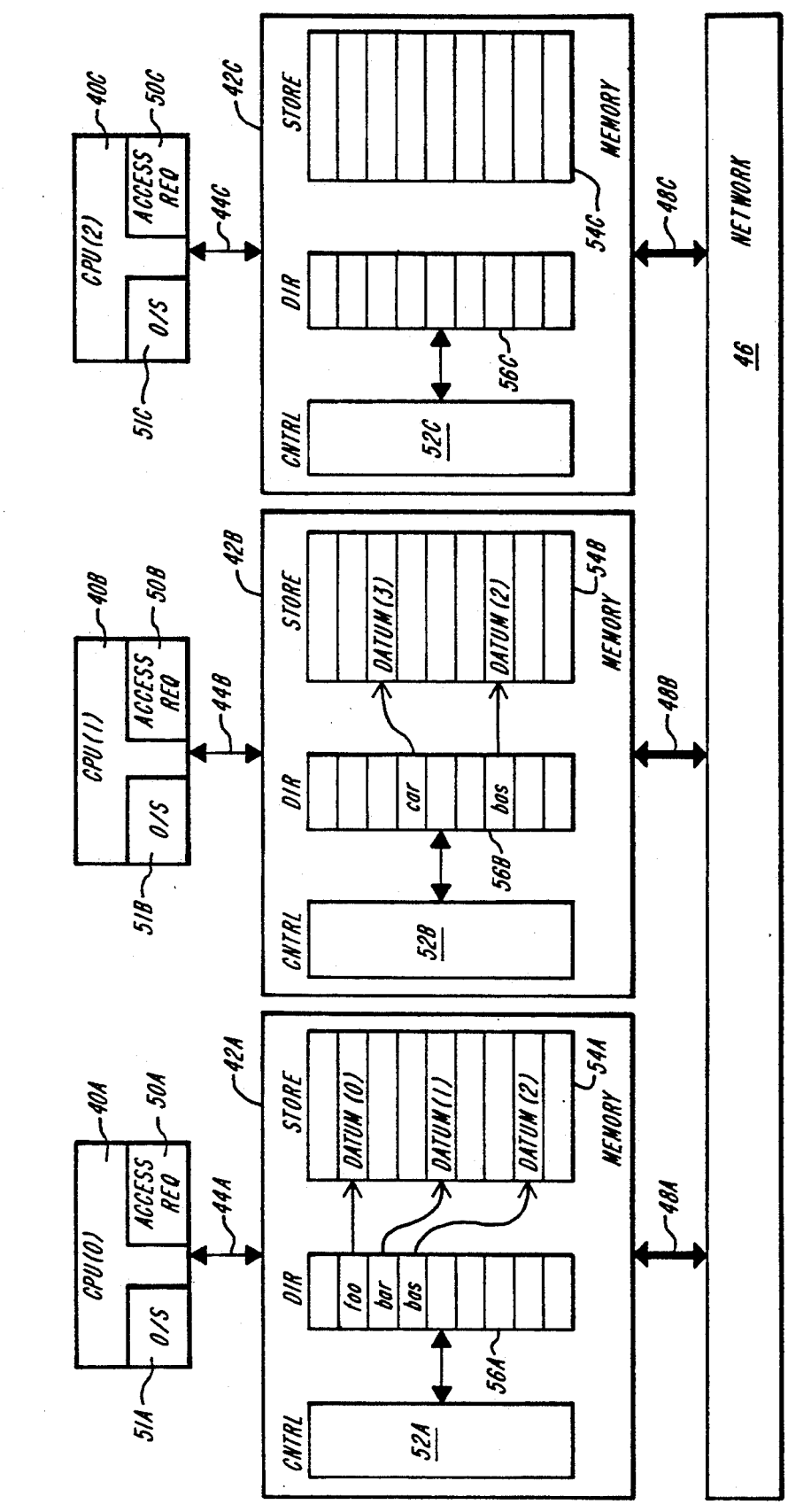
FIGS. 2A–2B depict a preferred memory configuration and data management function for the multiprocessor of FIG. 1.

FIG. 2A illustrates a mechanism for data movement within the processing system of FIG. 1 for insuring data coherence. In the drawing, plural central processing units 40(A), 40(B) and 40(C) are coupled, respectively, to associated memory elements 42(A), 42(B) and 42(C). Communications between the processing and memory units of each pair are carried along buses 44A, 44B and 44C, as shown. Network 46, representing the aforementioned level segments and routing cells, transfers information packets (passed to the network 46 over buses 48(A), 48(B) and 48(C) between the illustrated processing cells 42A–42C.

In the illustrated embodiment, the central processing units 40A, 40B and 40C each include an access request element, labelled 50A, 50B and 50C, respectively. These access request elements generate requests for access to data stored in the memory elements 42A, 42B and 42C. Among access requests signals generated by elements 50A, 50B and 50C is the ownership-request, representing a request for exclusive, modification access to a datum stored in the memory elements. In a preferred embodiment, access request elements 50A, 50B and 50C comprise a subset of an instruction set implemented on CPU's 40A, 40B and 40C. This instruction subset is described below.

The central processing units 40A, 40B, 40C operate under control of an operating system 51, portions 51A, 51B and 51C of which are resident on respective ones of the central processing units. The operating system 51 provides an interface between applications programs executing on the central processing units and the system 10 facilities, and includes a virtual memory management system for managing data accesses and allocations.

A preferred operating system for controlling central processing units 40A, 40B and 40C is a UNIX-like operating system and, more preferably, OSF/1, modified in accord with the teachings herein.

The memory elements 40A, 40B and 40C include cache control units 52A, 52B and 52C, respectively. Each of these cache control units interfaces a data storage area 54A, 54B and 54C via a corresponding directory element 56A, 56B and 56C, as shown. Stores 54A, 54B and 54C are utilized by the illustrated system to provide physical storage space for data and instruction signals needed by their respective central processing units. Thus, store 54A maintains data and control information used by CPU 40A, while stores 54B and 54C maintain information used by central processing units 40B and 40C, respectively. The data maintained in each of the stores are identified by unique descriptors corresponding to system addresses. Those descriptors are stored in address storage locations of the corresponding directory. While the descriptors are considered unique, multiple copies of some descriptors may exist among the memory elements 42A, 42B and 42C where those copies themselves identify copies of the same data element.

Access requests generated by the central processing units 40A, 40B and 40C include, along with other control information, a descriptor or SVA ("system virtual address") request portion matching that of the requested datum. The cache control units 52A, 52B and 52C respond to access requests generated their respective central processing units 40A, 40B and 40C by determining whether the requested datum is stored in the corresponding storage element 54A, 54B and 54C. If so, that item of information is transferred for use by the requesting processor. If not, the cache control unit 52A, 52B, 52C transmits a packet including the request to the network 46 along lines 48A, 48B and 48C.

As that packet travels within the networks and, particularly, along the ring:0 segments, cache control units within the processing cells check their own directories, passing the requested data, if found, in a response packet. Likewise the local routing element checks its directory. If that directory shows that the requested data is present in local ring in the proper access state, the routing cell permits the request packet to continue along the local ring bus. If not, the routing cell extracts the packet and passes to the associated level:1 segment.

The unresolved request packet travels along the level:1 segment in a similar fashion, i.e., it is compared with the directories of the associated level:1 routing cells. If one of those directories lists the requested data in the proper access state in a descendant level:0 segment, the request is passed to that segment. Otherwise, the request packet may pass to a higher level, if any, in the hierarchy or be returned to the requester unresolved.

Packets containing requested data are routed back to requesting cells by differing mechanisms. A first mechanism relies on the address, or ID, of the requesting cell. Here, each requesting cell includes within its request packet an ID uniquely identifying that cell. Once that packet reaches the responding cell, that cell copies the requestor-ID, along with the datum and corresponding descriptor, into the response packet. As the response packet travels along the segments rings, the routing cells examine the requestor-ID to determine whether the requesting cell is in a descendant or parent segment and route the packet accordingly.

A second mechanism is used in conjunction with response packets that include data requested by processing cells but not specifically generated in response to those requests. By way of example, the mechanism applies in instances where two or more requesting cells generate requests for read-only copies to a specific datum held in a remote cell.

Presuming, in accord with one preferred practice of the invention, that the network prevents at least some, but not all, of those requests from reaching a processing cell having a copy of that datum, the responding cell generates response packets bearing only the requestor-ID of a request packet that reached it.

Data coherency is maintained by cooperative action of the processing cells in response to data requests and transfers. More particularly, concurrent with generation of an ownership-access request packet by a first processing cell, the associated memory allocates in its store physical space to hold the requested data. Likewise, concurrent with the transfer of a requested datum from the processing cell in which it was previously stored, the associated memory deallocates physical storage space which had been previously allocated for storage of the requested datum.

Figure 2B:
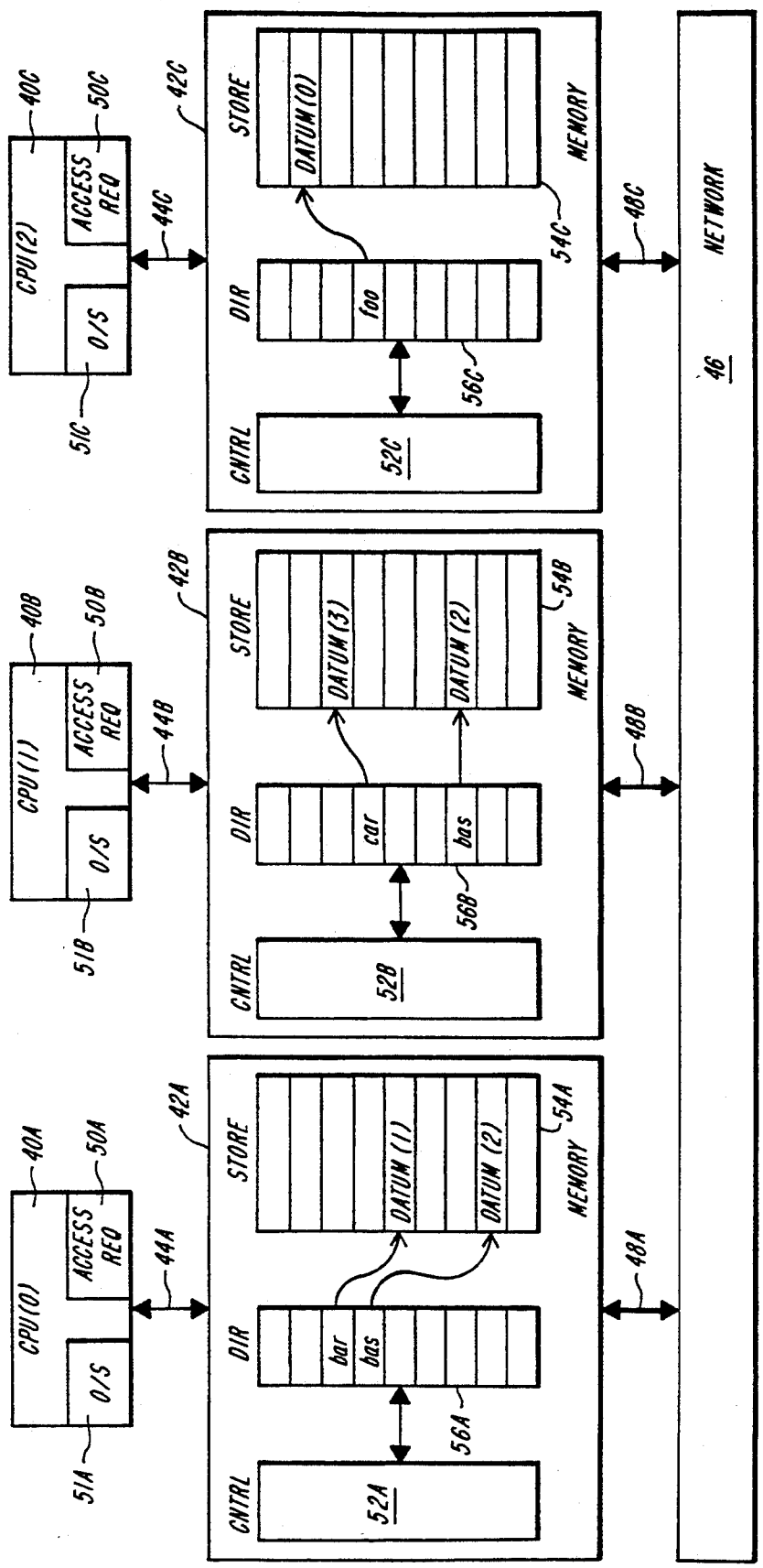

These cooperative actions are illustrated in FIGS. 2A and 2B. In the first of those drawings, DATUM(0), DATUM(1) and DATUM(2), representing data subpages, are retained in the store of the memory element 42A partnered with CPU 40A. Descriptors "foo," "bar" and "bas" which correspond, respectively, to those data stored in directory 56A. Each such descriptor includes a pointer indicating the location of its associated information signal in the store 42A.

The memory element 42B partnered to CPU 40B stores DATUM(2) and DATUM(3), which also represents a data subpage. Corresponding to each of those data elements are descriptors "car" and "bas," retained in directory 56B. DATUM(2), and its descriptor "bas," are copied from store 42A and, therefore, retain the same labels.

The system illustrated in FIG. 2A does not store any data in the memory element 54C partnered to CPU 40C.

FIG. 2B illustrates how a datum moves in conjunction with an ownership for it by processing cell which does not already have access to that datum. In particular, the illustration depicts the movement of DATUM(0) following issuance of an unresolved request for ownership for it by the processing cell made up of CPU 40C and memory 42C. At the outset, concurrent with the request, the cache control unit 52C allocates physical storage space in the store 54C of memory element 42C.

A response packet generated by memory 42A transfers the requested data, DATUM(0), from store 54A, where it had previously been stored, to the requestor's store 54C. Concurrently the cache control unit 52A deallocates that space in store 54A which had previously held the requested datum. At the same time, the cache control unit 52A effects invalidation of the descriptor "foo" in directory 56A (where it had previously been used to identify DATUM(0) in store 54A), while cache control unit 52C reallocates that same descriptor in directory 56C, where it will subsequently be used to identify the signal in store 54C.

In addition to descriptors, the memory elements 42A-42C assign access state information to the data and control signals in their respective stores. These access states, which include the invalid, read-only, ownership and atomic states, govern the manner in which data may be accessed by specific processors. A datum which is stored in a memory element whose associated CPU maintains modification access over that datum is assigned an ownership state. While, a datum which is stored in a memory element whose associated CPU does not maintain priority access over that datum is assigned a read-only state. Further, a purported datum which associated with "bad" data is assigned the invalid state.

A further appreciation of preferred structures (e.g., cache control units) for data movement and memory coherence in a digital data processing system constructed in accord with the invention may be had by reference to the above-cited related applications, e.g., U.S. Ser. No. 136,930, filed Dec. 22, 1987, and U.S. Ser. No. 370,287, filed Jun. 22, 1989, U.S. Ser. No. 521,798, filed May 10, 1990, U.S. Ser. No. 531,506, filed May 31, 1990.

Segment Bus

Figure 3:
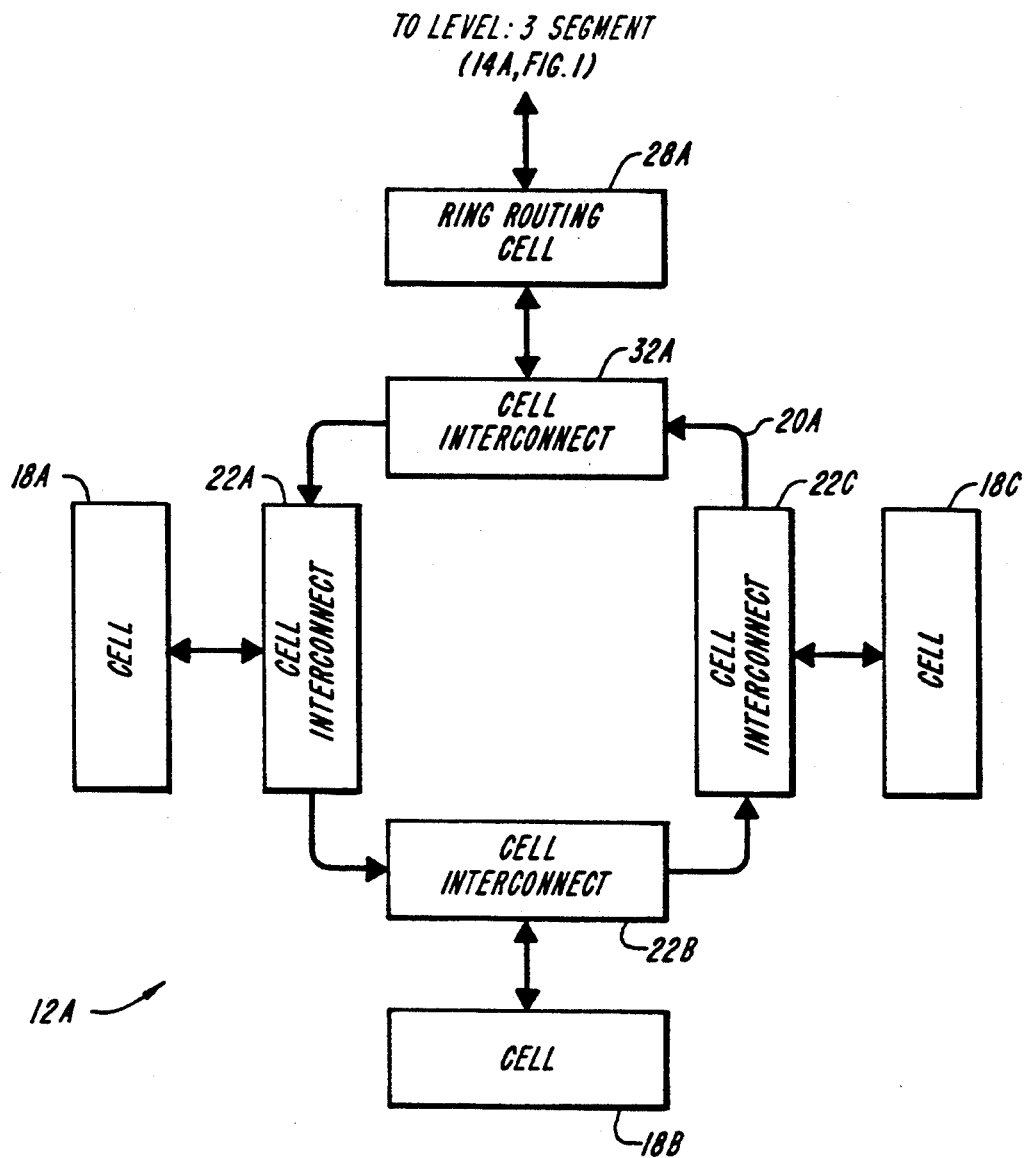
FIG. 3 depicts a preferred configuration for an exemplary level:0 segment of the multiprocessing system of FIG. 1.

FIG. 3 depicts a preferred configuration for exemplary level:0 segment 12A of FIG. 1. The segment 12A includes processing cells 18A, 18B and 18C interconnected by cell interconnects 22A, 22B and 22c along bus segment 20A. Routing unit 28A provides an interconnection between the level:0 segment 12A and if parent, level 1 segment 14a of FIG. 1. This routing unit 28A is coupled along bus 20A by way of cell interconnect 32A, as shown. The structure of illustrated bus segment 20A, as well as its interrelationship with cell interconnects 22A, 22B, 22C and 32A, may be fully appreciated by reference to the above-cited related applications, e.g., U.S. patent application No. 696,291.

Processing Cell

Figure 4:
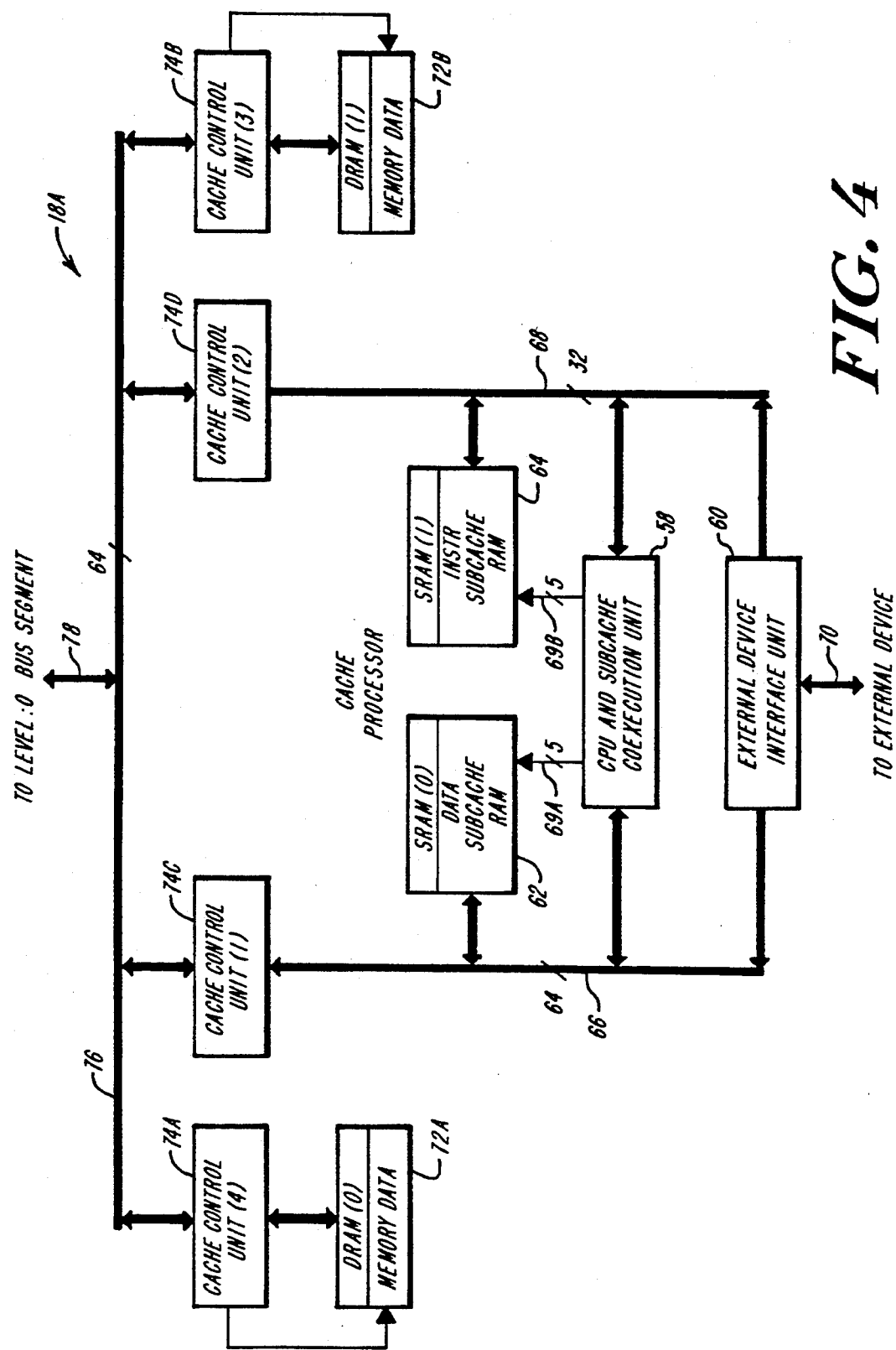
FIG. 4 depicts a preferred structure for processing cells of the multiprocessing system of FIG. 1.

FIG. 4 depicts a preferred structure for an exemplary processing cell 18A of the illustrated embodiment. The illustrated processing cell 18A includes a central processing unit 58 coupled with external device interface 60, data subcache 62 and instruction subcache 64 over processor bus 66 and instruction bus 68, respectively.

Interface 60 provides communications with an external device, e.g., disk drive 19A, over external device bus 70, in a manner conventional to the art.

A more complete understanding of the circuitry illustrated in this drawing may be attained by reference to the above-cited related patent applications, e.g., U.S. Ser. Nos. 136,930, filed Dec. 22, 1987, 370,325, filed Jun. 22, 1989 and 499,182, filed Mar. 26, 1990.

The Memory System

As discussed above, a multiprocessing system 10 constructed in accord with a preferred embodiment of the invention permits access to individual data elements allocated to processing cells 18A, 18B, ... 18R by reference to a unique descriptor, based on a system virtual address (SVA), associated with each datum. In the illustrated system 10, implementation of this capability is provided by the combined actions of the processing cell memory units in connection with their transfer of request and response packets over the network 46. In the discussion which follows, this is collectively referred to as the "memory system."

The illustrated system's processors, e.g., processors 40A, 40B, 40C, communicate with the memory system via two primary logical interfaces. The first is the data access interface, which is implemented by the load and store instructions. In data access mode, the processor presents the memory system with an SVA and access mode information, and the memory system attempts to satisfy that access by finding the subpage containing the data and returning it.

The second logical interface mode is control access, which is implemented by memory system control instructions. In control access, the processor instructs the memory system to perform some side effect or return some information other than the actual data from a page. In addition to the primary interfaces, the operating system 51 (e.g., the operating system) uses control locations in SPA space for configuration, maintenance, fault recovery, and diagnosis.

The memory system implements a hierarchy of storage. In the illustrated, preferred embodiment, each processing cell contains a central processing unit (or CEU) which has a subcache that stores 0.5 MBytes of data. Those processing cells also include caches, which store 32 MBytes of data. Moreover, a preferred level:0 having, for example, 15 processing cells stores a total of 480 MBytes. While, a preferred level:1 having, for example, 32 level:0's has a total of 15360 MBytes.

The memory system stores data in units of pages and subpages. For example, in the illustrated embodiment, each individual cache describes 32 Mbytes of SVA space, subdivided into 2048 pages pages contain $2^{14}$ (16384) bytes, divided into 128 subpages of $2^7$ (128) bytes. The memory system allocates storage in the caches on a page basis, and each page of SVA space is either entirely represented in the system or not represented at all. The memory system shares data between caches in units of subpages.

When a page of SVA space is resident in the system, the following are true:

(1) One or more caches allocates a page of storage to the page, each subpage of the page is stored on one or more of the caches with space allocated, but (2) Each cache with space allocated for a page may or may not contain a copy of all (or any) of the page's subpages.

A further appreciation of a preferred memory system for use in a digital data processing system constructed in accord with the invention may be had by reference to the above-cited related applications, e.g., U.S. Ser. No. 136,930, filed Dec. 22, 1987, and U.S. Ser. No. 370,287, filed Jun. 22, 1989, U.S. Ser. No. 521,798, filed May 10, 1990, U.S. Ser. No. 531,506, filed May 31, 1990.

Subpage States

The subpage states are defined in terms of three classes of subpage states invalid, read-only, and owner. These three classes are ordered in strength according to the access that they permit. Invalid states permit no access. Read-only state permits load and instruction-fetch access. There are several owner states all permit load access and permit the cache to respond to a data request from the network 46; some permit store access. Only one cache may hold a particular subpage in an owner state at any given time. The cache that holds a subpage in an owner state is called the owner of the subpage. Ownership of each subpage moves from cache to cache as processors request ownership via store instructions, special load instructions, and atomic state instructions (e.g., gsp or rsp) that request ownership.

Invalid States

When a subpage is not present in a cache, it is said to be in an invalid state with respect to that cache. If a processor requests a load or store to a subpage which is in an invalid state in its local cache, then that cache must request a copy of the subpage in some other state in order to satisfy the data access. There are two invalid states: invalid-descriptor and invalid.

When a particular cache has no descriptor for a particular page, then all of the subpages of that page are said to be in invalid-descriptor state in that cache. Thus, subpages in invalid-descriptor state are not explicitly represented in the cache.

When the CEU references a subpage in invalid-descriptor state, the local cache must allocate one of the descriptors (in the correct set) to the SVA. After the descriptor allocation is complete, all subpages in the page have invalid state.

When the local cache has a descriptor for a particular page, but a particular subpage is not present in that cache, then that subpage is in invalid state. The local cache will attempt to obtain the subpage data by communicating with other caches.

Read-Only State

There is only one read-only state: read-only. Any number of caches may hold a particular subpage in read-only state, provided that the owner of the subpage holds the subpage in non-exclusive state. If the owner of the subpage has any other state (i.e. an exclusive-ownership state, one of: exclusive, atomic, or transient-atomic), then no read-only copies can exist in any cell. The CEU cannot modify a subpage which is in read-only state.

Owner States

There are two basic owner state types: non-exclusive and exclusive-ownership. When a particular cache holds a particular subpage in non-exclusive state, then some other caches may be holding that subpage in read-only state. Programmatically, non-exclusive state is the same as read-only state. The CEU cannot modify a subpage which is in non-exclusive state. Non-exclusive state is basically a book-keeping state used by the memory system; it defines the ownership of the subpage.

The exclusive-ownership states are exclusive, atomic, and transient-atomic. When a particular cache holds a particular subpage in an exclusive-ownership state, then no other cache may hold a read-only or non-exclusive copy of the subpage. If the local cache has a subpage in an exclusive-ownership state, the CEU can modify subpage data provided that the STT grants write access to the segment and the descriptor.no_write flag is clear.

Atomic State

Atomic state is a stronger form of ownership than exclusive state. Subpages only enter and leave atomic state as a result of explicit requests by programs.

Fundamentally, atomic state can be used to single-thread access to any subpage in SVA space. When a processor executes a gsp.nwt (get-subpage, no-wait) instruction to request that a subpage enter atomic state, the instruction will only complete normally if the subpage is not in atomic state already. Thus, atomic state on a subpage can be used as a simple lock. The lock is locked when the gsp.nwt instruction completes normally by first obtaining the subpage in exclusive state and then changing state from exclusive to atomic. The lock is unlocked by executing the rsp (release-subpage) instruction. The rsp instruction requires that the subpage exist in some cache with atomic or transient-atomic state. The local cache obtains the subpage and then changes the subpage from atomic or transient-atomic state to exclusive state. (If the subpage has transient-atomic state, the operation is more complex, but the effect is programmatically the same.)

It is important to note that atomic state is associated only with a subpage; there is no association with a particular operating system process (typically a user program) or to a particular cell. It is possible for a process to execute a gsp instruction to get a subpage in atomic state and subsequently be switched by operating system 51 so that it continues execution on another cell. That process continues execution on the second cell and eventually executes an rsp instruction to release the subpage. Between those two instructions, there will only be a single copy of the subpage in the entire memory system, and it will be in atomic or transient-atomic state. As various processors execute instructions which reference the subpage, that single valid copy will move from cell to cell. It is also possible for a particular process to get atomic state, and another process to release atomic state.

Atomic state is simply an additional flag associated with a subpage; it is possible to implement protocols which use atomic state in addition to the data state of the subpage. Just as a protocol which is implemented using only data can have errors, it is possible for an atomic-state protocol to be defective. The hardware does not impose any checking on the use of atomic state beyond access control imposed by the STT and descriptor.noatomic.

Transient-Atomic State

The gsp.nwt instruction always completes within its defined execution time, but it can succeed or fail (depending upon the current state of the subpage in the memory system). A second form of the instruction is gsp.wt (get-subpage, wait), which will not complete until the subpage is obtained in exclusive state and changed to atomic state. The gsp.wt instruction relieves the programmer of the burden of determining whether or not the gsp instruction was successful. If the subpage is already in atomic or transient-atomic state when a processor executes gsp.wt, the processor will stall until the subpage is released, obtained by the local cache, and changed back from exclusive state to atomic or transient-atomic state. Use of the gsp.wt instruction can reduce the number of messages sent between caches as a cell waits for the opportunity to "lock the lock."

Transient-atomic state is used automatically by the memory system to allow gsp.wt to function efficiently. Its use is entirely transparent to the programmer. If a subpage is in atomic state and another cache executes gsp.wt on that subpage, that subpage enters transient-atomic state in the holding cache. When the subpage is later released with an rsp instruction, the transient-atomic state forces the subpage to be expelled onto the network 46 in a special release state. The releasing caches changes its own state for the subpage to invalid. Any cache which is executing a gsp will see the subpage and accept it. The accepting cache will then be able to complete its gsp instruction and the subpage will enter transient-atomic state in that cache. This operation will happen for each succeeding gsp and rsp until such time as an expelled subpage is not accepted by any other cache. At that time, the cache performing the release will change its subpage state back from invalid state (set when the subpage was released) back to exclusive state.

A further appreciation of preferred subpage states used in a digital data processing system constructed in accord with the invention may be had by reference to the above-cited related applications, e.g., U.S. Ser. No. 136,930, filed Dec. 22, 1987, U.S. Ser. No. 370,287, filed Jun. 22, 1989, U.S. Ser. No. 521,798, filed May 10, 1990, and U.S. Ser. No. 531,506, filed May 31, 1990.

Cache Directories

The associations between cache pages and SVA pages are recorded by each cache in its cache directory. Each cache directory is made up of descriptors. There is one descriptor for each page of memory in a cache. At a particular time, each descriptor is said to be valid or invalid. If a descriptor is valid, then the corresponding cache memory page is associated with a page of SVA space, and the descriptor records the associated SVA page address and state information. If a descriptor is invalid, then the corresponding cache memory page is logically not in use. There is no explicit validity flag associated with a descriptor; a descriptor may be considered invalid if the anchor and held fields are both clear, and there are no valid subpages present for the SVA page.

Each cache directory acts as a content-addressable memory. This permits a cache to locate a descriptor for a particular page of SVA space without an iterative search through all of its descriptors. Each cache directory is implemented as a 16-way set-associative memory with 128 sets. All of the pages of SVA space are divided into 128 equivalence classes, each associated with a cache directory set. A descriptor for a page can only be stored in the set of a cache directory that corresponds to the page's equivalence class. The equivalence class is selected by SVA[20:14]. At any given time, a cache can describe no more than 16 pages with the same value for SVA[20:14], since there are 16 elements in each set.

Figure 5:
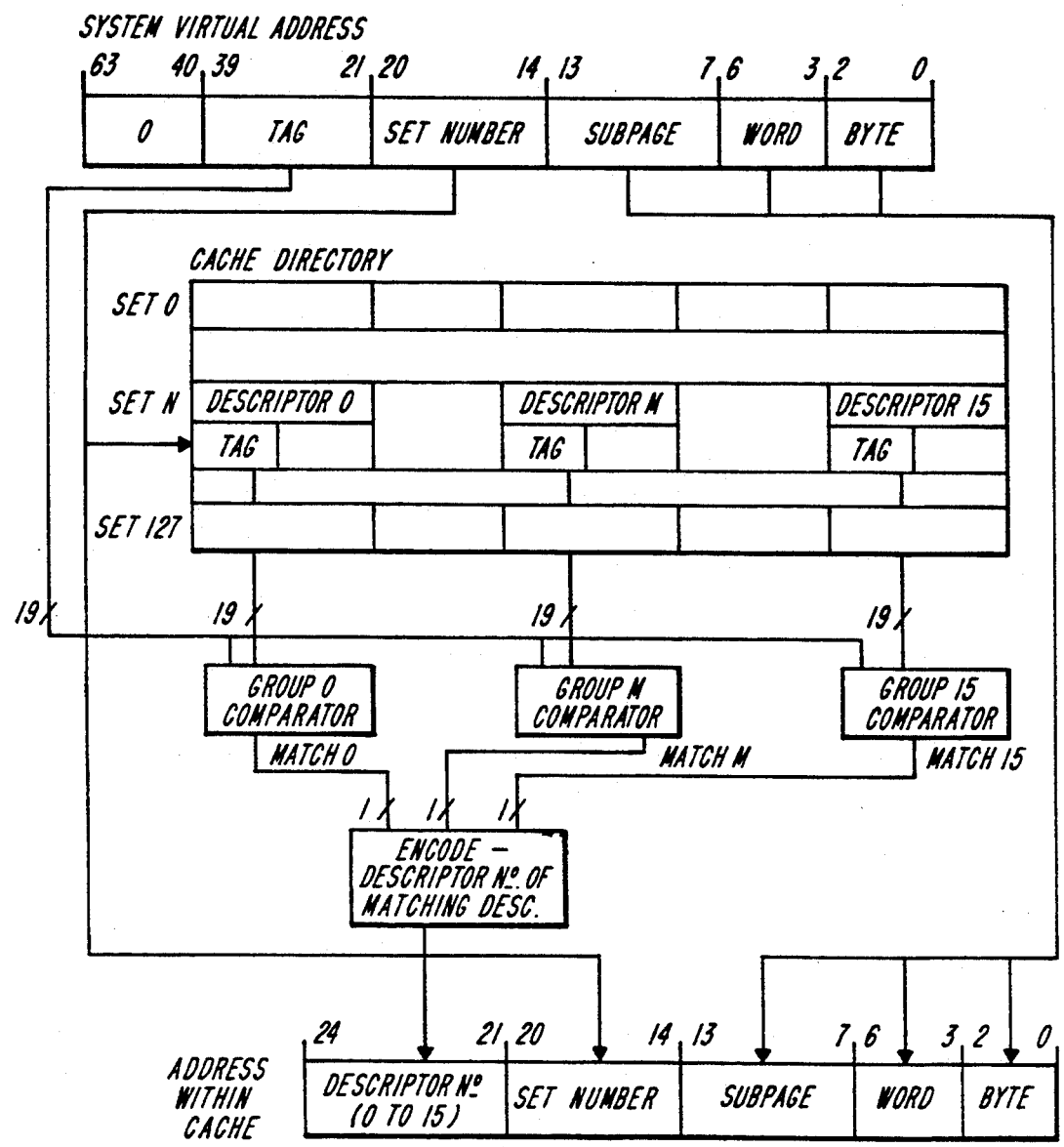
FIG. 5 depicts a preferred structure of a cache directory of the multiprocessing system of FIG. 1.

A preferred organization of a cache directory is shown in FIG. 5. When a reference to an SVA is made, the cache must determine whether or not it has the required information. This is accomplished by selecting a set within the cache, and then examining all the descriptors of that set. SVA[20:14] selects a set. In the general architecture, each of the descriptors in the selected set is simultaneously compared against SVA[63:21]. In a preferred embodiment having a 240 Mbyte SVA space, this implies a comparison with SVA[39:21]. If one of the elements of the set is a descriptor for the desired page, the corresponding comparator will indicate a match. The index in the set of the matching descriptor, concatenated with the set number, identifies a page in the cache.

If more than one descriptor matches, the cache signals a multiple descriptor_match exception. If no descriptor matches, the cache allocates a descriptor and requests data from the network. It is possible that either the allocation or data request will fail, and the cache will indicate an error to the CEU.

The use of SVA[20:14] to select a set is effectively a hash function over SVA addresses. The operating system 51 must assign SVA addresses so that this hash function gives good performance in common cases. There are two important distribution cases: referencing many pages of a single segment and referencing the first page of many segments. This set selector produces good cache behavior for contiguous groups of pages, since 128 contiguous pages will reside in 128 distinct sets However, this selector will produce poor hashing behavior for many pages with the same value in SVA[20:14]. The operating system 51 can avoid the latter situation by varying the logical origin of data within segments. For example, each per-process user stack can be started at a different segment offset.

Contents of a Descriptor

When a cell responds to a request for a subpage, it supplies the subpage data and the values of certain descriptor fields in the local cache. When the response returns to the requestor it either copies those fields to descriptor fields (if it has no other valid subpages) or logically OR's those fields into descriptor fields. Some descriptor fields are never supplied by the responder nor updated by the requestor.

In a preferred embodiment, the descriptor fields are defined as follows:

descriptor.tag (19 bits)

Bits [39:21] of an SVA. This field identifies the particular page of SVA space specified by the corresponding descriptor. For a given set in a given cell, this field must be unique among all 16 descriptors. Operating system 51 'sets' this field when it creates an SVA page. (It is also set by operating system 51 during cache initialization.)

descriptor.atomic_modified (1 bit)

A cache sets this bit flag to one when any subpage of this page undergoes a transition into or out of atomic state because a gsp or rsp instruction was successfully executed. It is also set when a subpage changes from atomic state to transient-atomic state. This flag is not set if a gsp fails because the subpage is already in atomic state or if a rsp fails because the subpage was not in atomic state. This flag is not set if the gsp or rsp fails because descriptor.noatomic is set. Operating system 51 sets this flag to zero to indicate that it has noted the atomic state changes. This field is propagated from cache to cache.

descriptor.modified (1 bit)

A cache sets this bit flag to one when any data is modified in the page. Operating system 51 sets descriptor.modified to zero to indicate that it has noted the modification of the page. This flag is not set if an attempt to modify data fails because descriptor.no_write is set. This field is propagated from cache to cache.

descriptor.referenced (1 bit)

The cache sets this field on references to the page and clears the field periodically. The field is used to reflect that the page was recently referenced.

descriptor.anchor (1 bit)

Software sets the field to indicate that data requests from other caches may not be honored nor may the descriptor be dropped. Any read or get request from another cache returns unresponded to the requestor, and is treated as if the page were missing. This field is set by operating system 51 as part of creating or destroying an SVA page, and as part of modifying the page descriptor.

descriptor.held (1 bit)

Software sets the field to indicate that the descriptor may not be dropped by the cache even if no subpages are present in the cache.

descriptor.no_atomic (1 bit)

Software sets this field to prevent any cache from changing the atomic state of any subpage of this page. An attempt to execute a gsp or rsp fails, and is signalled back to the processor. The processor signals a page_no_atomic exception. descriptor.no atomic can be altered even when some subpages have atomic state. This flag simply revents attempt to change atomic state, in the same way that descriptor.no_write simply prevents attempts to change data state. This field is propagated from cache to cache.

descriptor.no_write (1 bit)

Software sets this field to prevent modifications to the page by the local processor. An attempt to modify the page fails, and is signalled back to the processor. The processor signals a page_no write exception. This flag does not affect the ability of any cache to acquire the subpage in exclusive or atomic/transient-atomic state. This field is propagated from cache to cache.

descriptor.summary (3 bits)

Summarizes subpage state field of a set of subpages. There is one three-bit summary field for each set of subpages. The summary sometimes overrides the contents of the individual subpage_state fields for the subpages within the summary set.

descriptor.subpage_state (4 bits)

The subpage state consists of a three-bit state field and a single bit subcached status field. It is set by the cache to record the state of each subpage and to indicate whether or not any portion of the subpage is present in the CEU subcache.

A further appreciation of preferred structures for the cache directory and descriptors in a digital data processing system constructed in accord with the invention may be had by reference to the above-cited related applications, e.g., U.S. Ser. No. 136,930, filed Dec. 22, 1987, U.S. Ser. No. 370,287, filed Jun. 22, 1989, U.S. Ser. No. 521,798, filed May 10, 1990, and U.S. Ser. No. 531,506, filed May 31, 1990.

Subpage Atomic State Instructions

The subpage atomic instructions are the program interface to the get and release operations described above. These instructions exist in several forms to permit precise tuning of parallel programs.

get subpage [gsp.nwt]
get subpage & wait [gsp.wt]

Get subpage requests that a subpage be set into atomic state. For both forms of the get subpage instruction, if the subpage is not in atomic state in any cache, then the local cache acquires it in atomic state.

For gsp.nwt, the @MEM condition code indicates the success or failure of the attempt; the instruction will trap instead of changing @MEM if the trap option is present in the instruction and the subpage is already atomic.

The gsp.wt instruction form causes the cache to stall the CEU until the subpage can be obtained in atomic state. This reduces the amount of interconnect traffic if the program must obtain atomic state before it can proceed. If the subpage is already atomic in any cache (including the local cache), the instruction waits until the subpage is released. The local cache then acquires the subpage in atomic state. The @MEM condition is always changed to indicate success.

release subpage [rsp]

Release subpage is used to remove a subpage from atomic state. If the subpage is not present in the local cache, it is first requested in via the interconnect. Once the local cache has exclusive ownership, rsp proceeds. If the subpage is not in atomic state then release subpage does not change the subpage state. In this situation, the CEU will trap if the trap modifier is present for the instruction. If the subpage is in atomic state, it is changed to exclusive state. If the subpage is in transient-atomic state, it is changed to exclusive state and expelled onto the interconnect so that any waiting cell may acquire atomic state.

Page Manipulation

The system 10 handles page and descriptor in the manner described below This discussion assumes that an anchored descriptor exists on the local cache.

Creating an SVA page

Following the mpsa, the descriptor exists, but all subpages are in invalid state. Operating system 51 executes mpdw specifying that all subpage states should be set to exclusive. This causes a message to be sent on the network 46 so that any interested ring members may note the creation of the page.

The SVA page now exists, although its data values are undefined. Software must initialize the page using store instructions or 1/0 before allowing the user to reference the page. For this reason, the operating system 51 will typically create a page at an SVA location inaccessible to user programs, initialize the page data, and then change the address of the SVA page as described below. The page is released for general use by executing an mpdw instruction which clears the anchor.

Destroying an SVA page

After the mpsa, operating system 51 must obtain all subpages in exclusive state. This is done using mfsva instructions. The operating system 51 then executes mpdw specifying that all subpages should be changed to invalid state. This instruction causes a message to be sent on the network 46 so that any interested ring members may note the destruction of the page. The SVA page is destroyed by this operation. Software releases the descriptor for reuse by executing a second mpdw which clears the anchor.

Change Descriptor Fields

The mpdw instruction is used to change various fields in a local descriptor. It can set or clear the modified, atomic_modified, no_write, noatomic, and held fields and can clear the anchor field. mpdw can also change the tag, and thus the SVA space address associated with the descriptor. (Since the index of the descriptor forms part of the SVA, the new tag is in the same cache set, by definition.)

To ensure memory system consistency, operating system 51 must obey certain rules when altering the fields or tag of a descriptor. mpdw requires that descriptor.anchor be set (although the instruction itself may result in clearing descriptor.anchor). Various sequences require that all subpages be present in the local cache with an exclusive-ownership state. This is accomplished by setting descriptor.anchor and executing mfsva.ex for each subpage. Various sequences require that all subpages be unsubcached in the local cache. This is accomplished by executing mflsp for each subpage which might be subcached in the local CEU. (Executing mfsva.ex ensures that a subpage is not subcached in by the CEU of any other cell.)

Memory System Control Instructions

Memory system control instructions permit the processor to directly manipulate the memory system. There are two classes of control instructions: data movement and page state control. The data movement control instructions move pages and subpages of data from cache to cache in the hierarchy. The page state control instructions manipulate page descriptors.

These CEU instructions result in cache commands which execute synchronously or asynchronously, depending upon the command. A CEU cache instruction may occupy an entry in the cache PRT (a hardware table) while it is in progress. The PRT has four entries, so a maximum of four cache instructions may execute in parallel. Most of these CEU instructions result in assignment of a PRT entry which remains in use until the request is satisfied, providing synchronous behavior. For example, load/store instructions execute synchronously, so that certain software-controlled exceptions (such as missing page or unwriteable page) can be predictably resolved. The pcsp (prefetch-cache-subpage) and pstsp (post-store-subpage) instructions operate asynchronously, as described in following subsections.

Synchronous errors typically result in the CEU executing the trap sequence.

Asynchronous errors result from actual hardware errors or are provoked by a request from some other cache. Such errors are reported by memory-system interrupts.

Fetch Subpage Instruction

The mfsva instructions permits operating system 51 to fetch a subpage in read-only or exclusive-ownership state, specifying the SVA location of the subpage. This saves operating system 51 the effort of establishing a DSTT translation, as is required by pcsp.

Flush Subcached Subpage Instruction

The mflsp instruction causes the cache to ensure that the specified subpage is not subcached in the local CEU. If the subpage is in invalid-descriptor state or invalid state, no descriptor is allocated and the subpage is not requested via the network 46.

Recombine Subpage Instruction

The mrcsp instruction allows operating system 51 to reduce the number of active descriptors for a page by causing ownership to migrate to another cache. Unlike the background recombine activity of the cache, this instruction is not controlled by cache configuration parameters.

The page state control instructions operate on individual pages of SVA space.

Anchor Descriptor Instruction

The mpsa instruction provides an anchored descriptor in the local cache for an SVA page. If the descriptor already existed prior to the mpsa, its anchor flag is set. Otherwise, the cache allocates a descriptor and then sets the anchor flag. Page state control operations require that an anchored descriptor for the SVA page be present on the local cache.

Write Descriptor Instruction

The mpdw instruction is used to create and destroy SVA pages, and to change descriptor flags of existing SVA pages. mpdw requires that operating system 51 first obtain an anchored descriptor for the page, using the mpsa instruction.

A further appreciation of memory system control instructions in a digital data processing system constructed in accord with the invention may be had by reference to the above-cited related applications, e.g., U.S. Ser. No. 136,930, filed Dec. 22, 1987, U.S. Ser. No. 370,287, filed Jun. 22, 1989, U.S. Ser. No. 521,798, filed May 10, 1990, and U.S. Ser. No. 531,506, filed May 31, 1990.

Virtual Memory System

As noted above, the operating system 51 includes a mechanism for managing data accesses and allocations. That mechanism is referred as the "virtual memory" or "VM" system. As part of the operating system 51, at least portions of the VM system are resident on every cell, for example, for operation in conjunction with central processing units 40A, 40B, 40C.

The VM system has three major responsibilities. First, it manages each process's context address (CA) space. This includes the mapping of CA space to a region of SVA space using the segment translation table entries (STTE's). This also includes process management. Aspects of these functions are discussed in further detail below.

Second, the VM system is responsible for resolving page faults and most of the trap conditions. Part of this task is reducing the frequency of the more severe types of faults, such as "line-fulls" and faults that result in paging to or from devices. This is handled by attempting to make the most efficient use of the physical memory available in the system. Aspect of this second function are discussed in further detail in copending, commonly assigned U.S. Ser. No. 763,132, filed this day herewith, Sep. 20, 1991, for IMPROVED DIGITAL DATA PROCESSOR WITH DISTRIBUTED MEMORY SYSTEMS.

Third, it manages the SVA space. This includes mapping of objects (files, devices, etc.) to SVA regions and the maintenance of atomic state information for those regions. Aspects of this aspect of the invention are disclosed in copending, commonly assigned application U.S. Ser. No. 763,132 filed this day herewith, Sep. 20, 1991, for DIGITAL DATA PROCESSOR WITH IMPROVED PAGING.

Addressing

The memory architecture of system 10 consists of two levels of related address space: context address (CA) space and system virtual address (SVA) space. Context address space is the programmer's interface to memory. There are many context address spaces in a system. System virtual address space stores the data from all context address spaces. There is only one system virtual address space. Another address space, the system physical address space (SPA) defines hardware control registers.

The processors, e.g., 40A-40C, distinguish between instruction and data references. Instruction references occur as the result of fetching sequential instructions, or because a processor has executed a control-flow class instruction. All other references to context address space are made by load/store-class instructions, and are classified as data references.

When the instruction subcache is enabled, the processor translates instruction context address references to system virtual addresses as part of accessing instructions. The data subcache is always enabled, and data context address references always translated to system virtual addresses as part of accessing data.

A context address space is a two-dimensional segmented address space. Each segment is identified by a segment number. An address in a context space consists of a segment number and an offset within the segment. Each context address space is defined by a set of mappings from context segment numbers to locations in SVA space. The mapping from context address space to SVA space is controlled by system software. The definition of each segment consists of system virtual space origin—the location in the linear SVA space of the beginning of the segment.

size—each data segment has a length that ranges from $2^{22}$ to $2^{40}$ bytes. Each instruction segment has a length that ranges from $2^{22}$ to $2^{40}$ bytes.

access control—Each data segment has a set of access control permissions that determine whether it may be read, written, or executed. An instruction segment can be referenced if a translation is known to the processor.

Segments from different context spaces can be translated to the same locations in SVA space. This facilitates sharing of data and programs; however, a given portion of SVA space cannot be simultaneously in use as both instructions and data. Since each context has its own access control information, the sharing can be controlled on a context space by context space basis.

Figure 6:
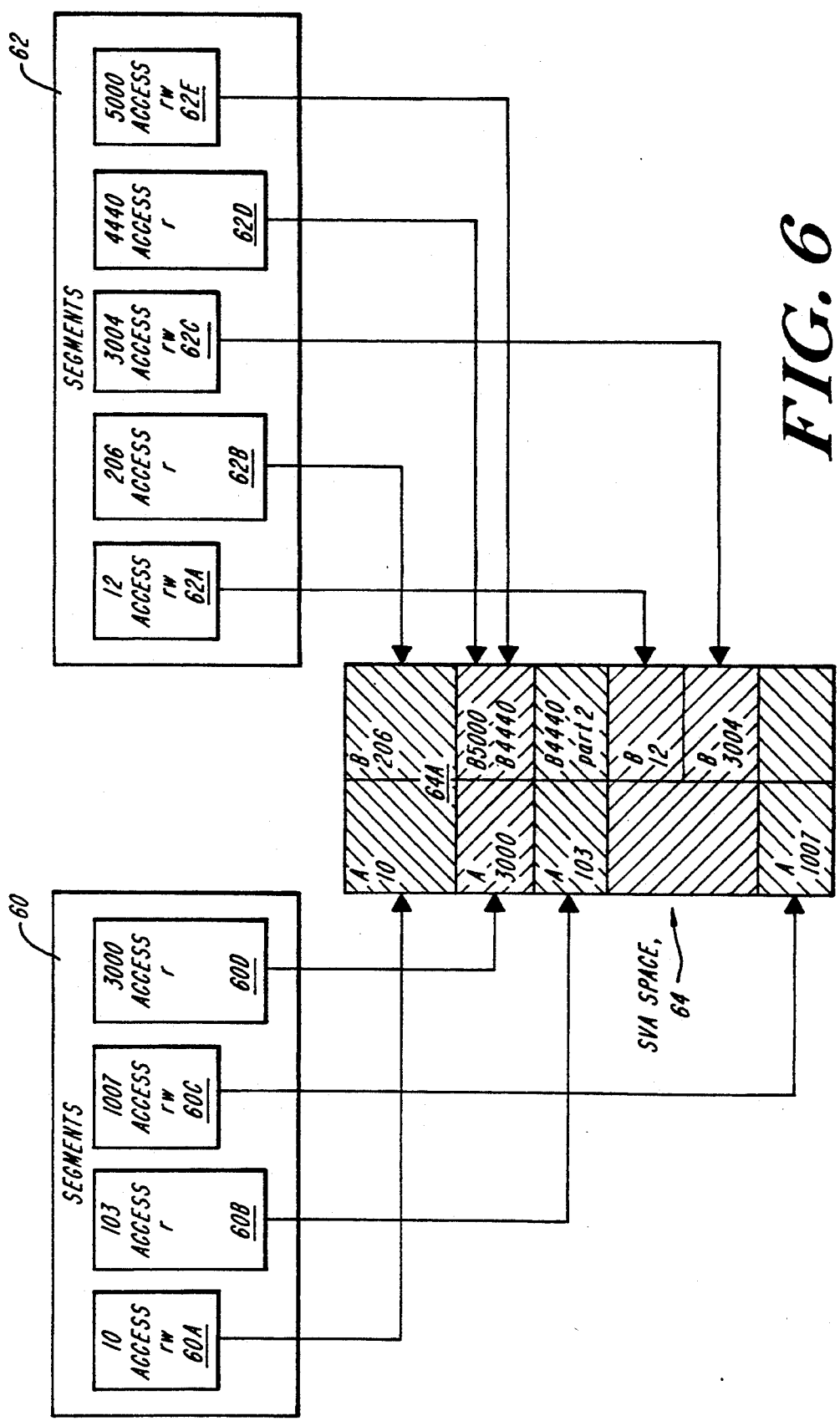
FIG. 6 depicts a mapping between context address space and SVA space in the digital data processor of FIG. 1.

FIG. 6 depicts this mapping of context address space. There are two contexts: 60 and 62. Context 60 consists of four segments 60A-60D and onlext 62 consists of five segments 62A-62E. Each segment is identified by a segment number, e.g., segment 60A is identified by segment number 10, segment 60B by segment number 103, and so forth.

The arrows of FIG. 6 show the mapping of the segments 60A-60D and 62A-62E to SVA space. As shown in the illustration, some segments from the two contexts 60, 62 map to common regions of SVA space. For example, segments 60A and 62B map into region 64A.

The system 10, including the VM system, permits a portion of SVA space to be viewed as one segment or several segments, as with segments 60B and 60D in context space 60 and segment 62D in context space 62. The system architecture also permits multiple segments of the same or differing size in the same context address space to refer to the same SVA space, as with segments 62D and 62E in context space 62.

SVA space is the normal access path to the memory management by the caches 42A-42C. As discussed above, a reference to SVA space is satisfied by searching the caches for the SVA space page containing the item referenced. If the necessary portion is not present in any of the caches, an exception is signalled. Software cooperates with hardware to have the necessary data available in the caches, including moving data to and from I/O devices such as disk storage. In this regard, see the aforementioned related application DIGITAL DATA PROCESSOR WITH IMPROVED PAGING, U.S. Ser. No. 763,368, filed this day herewith, Sep. 20, 1991.

The programmers' view of the memory architecture of system 10 is the two-dimensional context address space. The VM system controls mapping context segments to SVA space, which is transparent to application programs.

Figure 7:
FIG. 7 depicts the components of a context address in the digital data processor of FIG. 1.

Addresses in context space are called context addresses. A context address consists of a segment number (CA.segment) concatenated to an offset (CA.offset). The size of CA. segment varies according to the segment size. This is shown in FIG. 7.

It will be appreciated that the boundary between the segment number and the offset cannot be determined by examination of the address itself. To determine the segment containing a particular context address, the program must have access to the data structures defining the segments.

Address Translation

The VM system uses facilities of the central processing units, e.g., 40A-40C, to define context address spaces as translations from context segment numbers to SVA space. Each CPU, e.g., 40A, can automatically translate a limited number of context segments to SVA space via internal tables, referred to as segment translation tables (STT's). There is one STT for instruction fetches and one for data references. The STT's are fully associative tables; the instruction side table has 8 entries, the data side table has 16 entries. The individual entries of the STT's are Segment Translation Table Entries (STTEs). The VM system multiplexes these tables to define arbitrarily large context address space.

Address translation is the process of translating a context address to a SVA space address. Address translation replaces the segment number of the context address with a corresponding 'SVA space segment number.' The SVA space is not segmented, so the SVA segment number is merely a conventional name for the most significant bits of the SVA space address.

Multiple context addresses can map to the same SVA space address. It is possible to have the same or distinct context addresses in one or more contexts all referring to the same locations in SVA space. It is also possible to have context segments of different sizes with parts of their SVA space addresses in common. When discussing the reverse of that translation, the same SVA space address will be divided differently into context segment number and offset.

Figure 8:
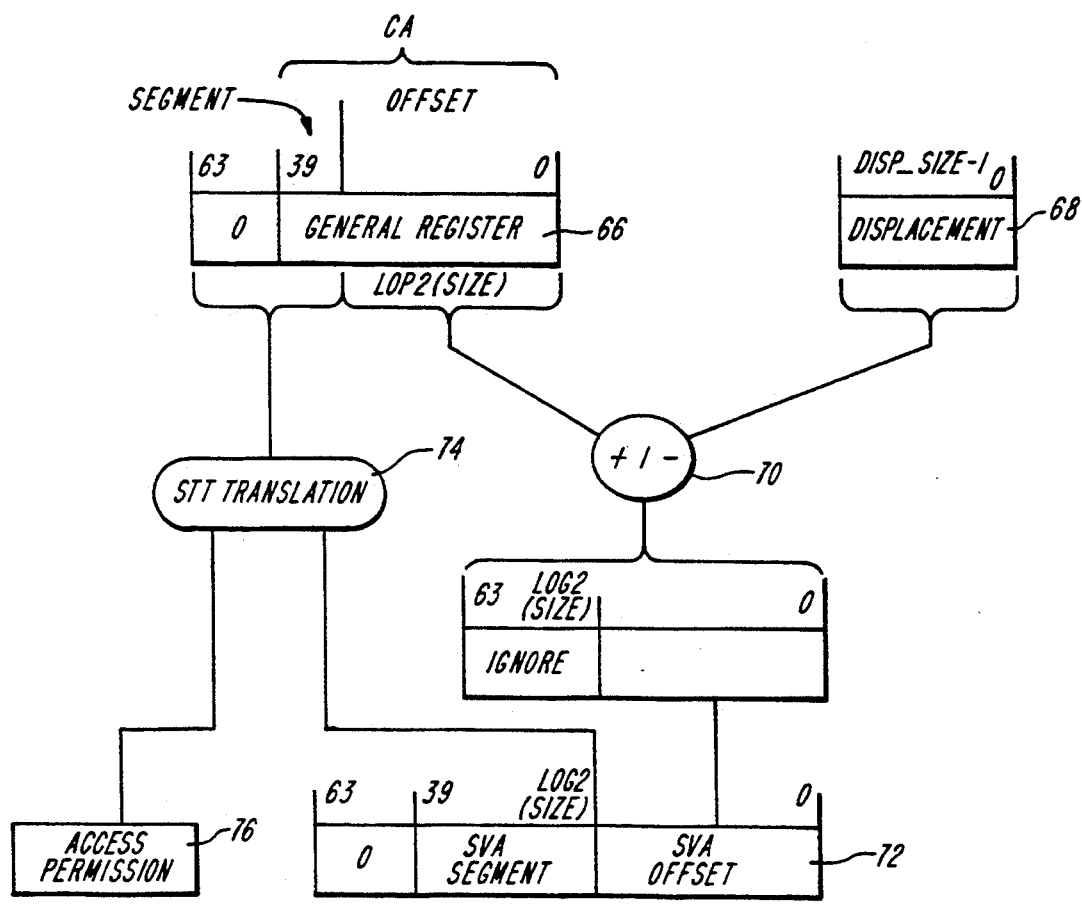
FIG. 8 depicts a process or address translation in the digital data processor of FIG. 1.

Address translation is depicted in FIG. 8. It begins when an instruction (not shown) specifies a context address via a general register 66, a displacement 68, and a displacement operation (add or subtract) 70. The size of the displacement varies according to the instruction and is either added to or subtracted from the general register value (depending on the displacement operation) to form SVA.offset 72, which contains as many bits as the segment size requires.

Once SVA.offset is determined, the CPU, e.g., 40A, searches the appropriate STT for an STTE that matches the higher-order bits of the general register. The results are undefined if the highest-order 24 bits of a data or instruction address are not zero; i.e., some random STTE may be used for translation. Each STTE contains a match key and translation result. The match key consists of a context segment number and size information. The translation result 74 provides a SVA 'segment number' (SVA.segment); for data references, access permission information 76 is also determined.

Each STTE has a valid bit which indicates whether or nor the STTE may be considered during a translation attempt. Each valid STTE of the appropriate STT is examined. If as many of the most significant bits of the effective address as are specified by an STTE segment size match the corresponding STTE context segment number, then that STTE matches. If no STTE matches, the CPU signals a missing segment exception. If more than one STTE matches, the CPU signals a multiple_stt_match exception.

If a matching STTE is found, then the corresponding SVA segment number becomes the segment number of the SVA space address. For a segment of size n, SVA[39:log2(n)](SVA.segment) comes from the SVA segment number.

The access permission fields in a data STTE control read, transaction, and write accesses. Execution of instructions requires only that the context address be translated by the Instruction STT. Insufficient access permission results in an access_violation exception.

The above discussion assumes that the segment size is known a priori, and is used to select the boundary between the segment number and the offset. In fact, the segment size is encoded in the STTE. The actual STT lookup, which is more complex, is discussed below.

STT Translation

Figure 9:
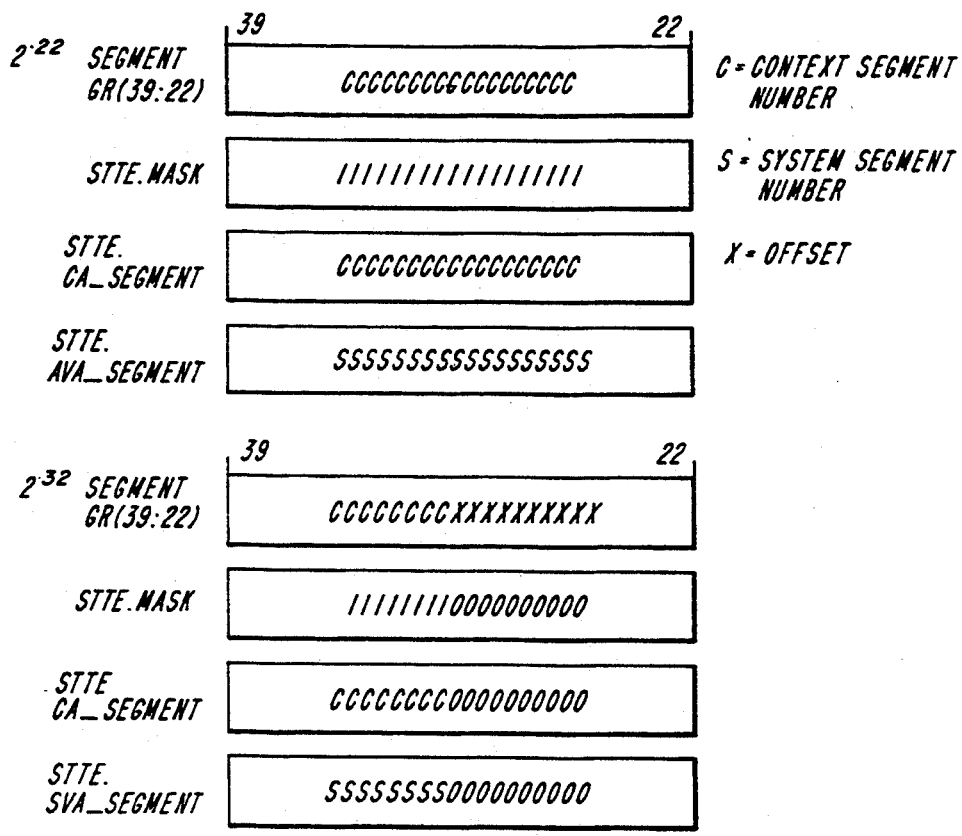
FIG. 9 depicts segment translation table fields in the digital data processor of FIG. 1.

FIG. 9 depicts STT fields in a digital data processor 10 constructed in accord with the invention. The segment number of the context address occupies some portion of the high order bits of the general register (GR) used to calculate the effective address. Bits GR[63:40] are treated as 0. Bits GR[39:22] are part of the segment number or are used in the calculation of the offset, depending on the size of the segment.

The VM system sets the STTE.ca_segment[39:22] to contain the segment number justified in the same way as GR. If the segment size is greater than $2^{22}$, the low order bits of STTE.casegment that correspond to the offset are insignificant, and must be specified as zero. The high-order bits in STTE.mask which are set to one indicate which of the bits STTE.casegment[39 22] are to be translated from a context address to a SVA space address. For example, a segment of size $2^{26}$ bytes has the most significant fourteen bits of STTE.mask set to ones, and the other four bits are zeros.

In the $2^{22}$ example, all of GR[39:22] contains segment number, and none of them contain offset. STTE.mask is all ones, and all of STTE.casegment is significant. In the $2^{32}$ example, GR[39:22] contains segment number, and GR[31:22] contains offset. This is declared by the zeros in the corresponding positions in STTE.mask. Because an STTE mask is only valid when the high-order zero through eighteen bits are ones, without any intermixed zeros, the result of using an invalid STTE mask is undefined.

For data references, the DSTT simultaneously matches GR[39:22] against all of the valid DSTTEs. For each DSTTE, it compares GR[39:22] masked by DSTTE.mask with DSTTE.casegment. The matching DSTTE, if any, is used in address translation. If no DSTTE matches, the CPU signals a missing segment exception. The DSTTE.valid flag must be set for a DSTTE to take Part in the translation attempt.

For instruction references, the ISTT simultaneously matches GR[39:22]against all of the valid ISTTEs. For each ISTTE, it compares GR[39:22] masked by ISTTE.mask with ISTTE.casegment. The matching ISTTE, if any, is used in address translation. If no ISTTE matches, the CPU signals a missing segment exception. The ISTTE.valid flag must be set for an ISTTE to take part in the translation attempt.

It is an error for there to be two valid STTEs that match the same context address in a side (instruction or data) of the STT at one time. This error is detected, and produces a multiplesttmatch exception. If an STT multiple-match occurs, the system_address portion of the matching STTEs is destroyed.

Figure 10:
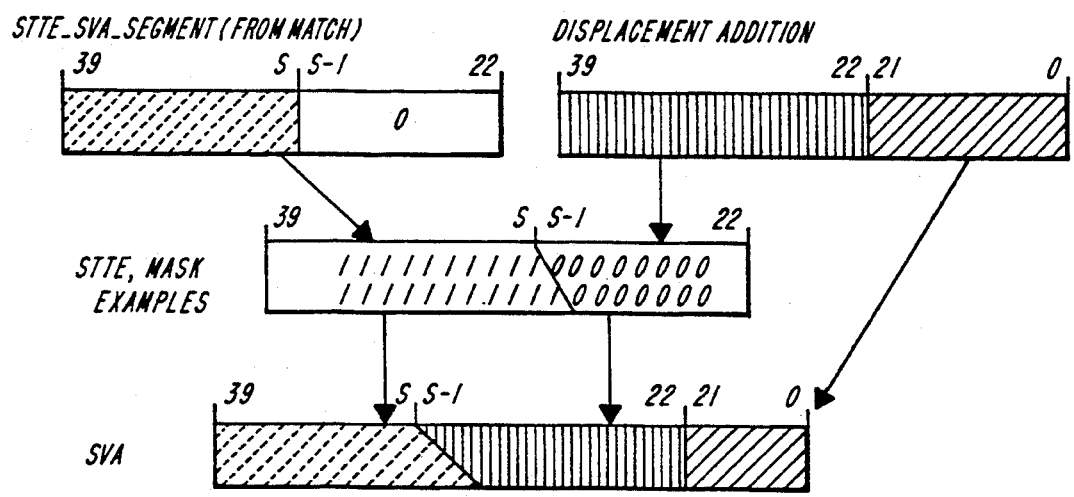
FIG. 10 depicts how the digital data processor of FIG. 1 generates a system virtual address.

While an STT match is in progress, the CPU, e.g., 40A, adds GR]39:0] to the sign-extended displacement. Bits [21:0] of this sum become SVA[21:0]. The remainder of the SVA space address, SVA[39:22] is formed by combining STTE.casegment [39:22] with bits [39:22] of the sum under the control of STTE.mask. The portion of the sum bits [39:22] that correspond to zero bits in STTE.mask become the corresponding bits in the SVA. The portion of STTE.casegment [39:22] that corresponds to one bit in STTE.mask become the corresponding bits in the SVA. FIG. 10 depicts how this process results in generation of an SVA.

Note that if the displacement addition carries out of the offset portion of the address into the segment number portion of the address (i.e., from bit S-1 into bit S, as shown in FIG. 10), the result is undefined. In using the SVA space, the system trap handler starts at context address 0, thereby occupying the first instruction-side segment (of whatever size) in every context.

Each data STTE contains access permission information in DSTTE.access. DSTTE.access encodes different access rights for the two different privilege levels indicated by !context.PL. The access rights grant or deny three types of access to data: read, transaction, and write. Read and transaction access is always granted to privilege-level 0. Read access for privilege-level 1 is controlled by DSTTE.access[0]. Transaction and Write access are independently encoded in DSTTE.access[2:1]. Read access permits the program to read the data, but not to change atomic state. Transaction access permits the program to alter the atomic state of data using instruction such as gsp (get-subpage). Write access permits the program to alter atomic state, and write. Read access is required in addition to transaction access for proper operation of transactions.

Access to instruction segments is granted to either privilege level by virtue of the existence of a valid ISTTE which translates the context address. Level 0 always has access to read and change atomic state of all defined segments in the data side of the STT. The VM system can deny this access to level 0 only by declining to load an STTE for the segment.

In the following table, each value of DSTTE.access specifies either null, read, trans(action), or write access for each of the two privilege levels. Write implies transaction access.

| | DSTTE.access[2:0] Encoding | |
|---|---|---|
| DSTTE.access | PL=0 | PL=1 |
| 000 | read,transaction | null |
| 001 | read,transaction | read |
| 010 | read,transaction | transaction |
| 011 | read,transaction | read,transaction |
| 100 | read,write,transaction | null |
| 101 | read,write,transaction | read |
| 110 | read,write,transaction | write,transaction |
| 111 | read,write,transaction | read,write,transaction |

Process and Context Address Space Management

Figure 11:
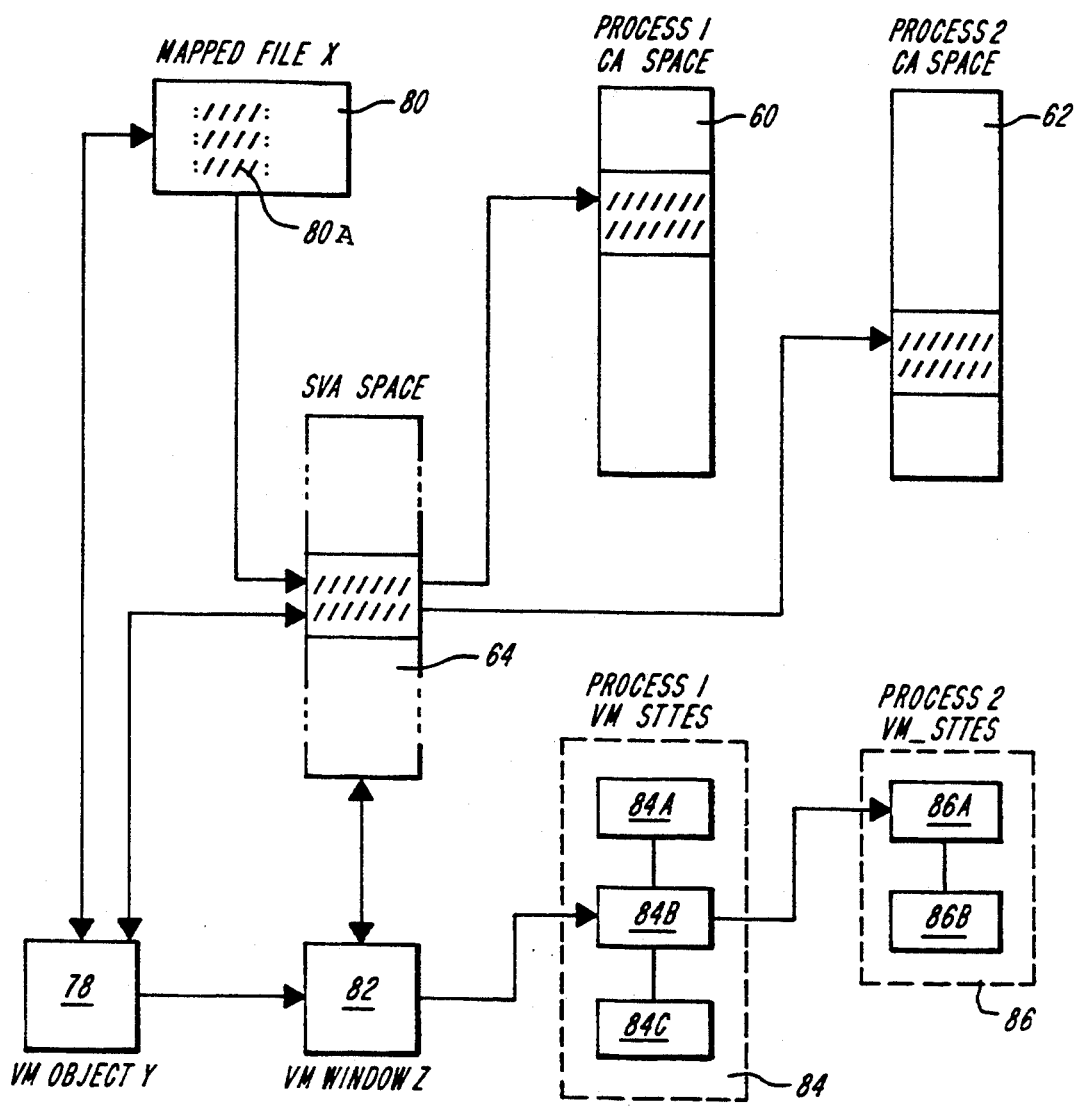
FIG. 11 illustrates the interrelationship of preferred data structures used by the digital data processor of FIG. 1 for address space management.

FIG. 11 illustrates the interrelationship of preferred data structures used by the digital data processor 10 for address space management and, more particularly, to provide improved checkpointing and forking. Illustrated data structure 78, referred to as a vm_object, stores general mapping information about a file 80 to which the VM system has mapped access. That file includes a portion 80A which is mapped into the SVA 64. Information concerning the mapped-in area 80A is stored in data structure 82, referred to as a vm_window.

Mapped-in portions of the file 80 can be associated with different context address spaces of processes on the digital data processing system 10. For example, as shown in FIG. 11, mapped-in portion 80A of file 80 is associated with two different context address spaces 60, 62 each of a respective process (not shown). This association of context address space to SVA space is reflected in segment translation tables, referred to as STT's, 84 and 86, respectively. Each table includes entries, referred to as STTE's, shown in FIG. 11 as STTE's 84A, 84B, 84C and 86A, 86B. These STTE's, which are also referred to as "vm_sttes," are linked in two directions: by process and by vm_window.

Preferred constructs for the vm_objects, vm_window and vm_sttes are presented below.

Data Structures

A preferred structure of vm_object 78, presented in the C programming language, is as follows:

```
typedef
enum vm_obj_type [        /* Specifies whether VM object
                             holds text of date. */
    VM_DATA_OBJECT,
    VM_TEXT_OBJECT,
] vm_obj_type t;
typedef
enum vm_obj_state [       /* Specifies the state of a VM
                             object. */
    VM_OBJ_NOT_IN_USE,
    VM_OBJ_CACHED,
    VM_OBJ_ACTIVE,
    VM_OBJ_DELETED,
] vm_obj_state_t;
typedef
struct vm_obj [
    sem_t           lock;             /* Locks the object entry. */
    struct vm_obj   *next_obj;        /* Next object in list. */
    struct vm_obj   *prev_obj;        /* Previous object in list. */
    vm_obj_p_off_t  low_addr_mapped;  * Lowest page mapped. */
    vm_obj_p_off_t  high_addr_mapped; /* Highest page mapped.*/
    vm_obj_type_t   object_type;      /* Code or Text */
    vm_obj_state_t  state;            /* Cached, active, deleted. */
    time_t          cached_time;      /* Time on cached list (if any). */
    u_int16         num_windows;      /* # of windows in the object. */
    u_int32         offset_in_file;   /* File offset of base, if text. */
    struct vnode    *mapped_file;     /* File mapped to this object. */
    struct vnode    *atomic_state_file; /* Object's atomic state file. */
    struct vm_obj   *overlay_object;  /* If not NULL, overlay object. */
    u_int8          *overlay_count;   /* Number of objects using this as an overlay object */
    struct vm_window *first_window;   /* First window in this object. */
    struct vm_window *last_window;    /* Last window in this object. */
] vm_obj_t;
typedef
struct vm_obj_list [
    sem_t       lock;         /* Lock for object list. */
    u_int32     num_objects;  /* # of objects in list. */
    vm_obj_t    *first_object;/* First object on list. */
    vm_obj_t    *last_object; /* Last object on list. */
]vm_obj_list_t;
```

A preferred structure of vm_window 82 is as follows:

```
typedef
enum vm_window_state [
                      /* Specifies the state of a VM
                         window. */
    VM_WIN_NOT_IN_USE,
    VM_WIN_CACHED,
    VM_WIN_ACTIVE,
    VM_WIN_PENDING_SWAPPED,
    VM_WIN_SWAPPED,
] vm_window_state_t;
typedef
enum vm_win_acc [     /* Specifies the access pattern
                         for a VM
    VM_UNKNOWN,       window. */
    VM_RANDOM,
    VM_SEQ_FORWARD,
    VM_SEQ_BACKWARD,
] vm_window_acc_t;
typedef
struct vm_window [
    sem_t              lock;          /* Locks the window entry. */
    vm_obj_t           *object;       /* This window object. */
    caddr_t            base_sva;      /* SVA of base of window */
    u_int32            window_length; /* Length of the window. */
    vm_window_state_t  state;         /* Window state - active, cached, pending swapped, or swapped */
    vm_window_acc_t    access_mode;   /* Expected access type (random, sequential forward, etc.) */
    bool_t             atomic_enabled;/* If true, atomic ops are OK. */
    u_int16            procs_waiting; /* # of processes waiting on window. */
    u_int16            reference_count;/* # of maps to this window. */
    u_int16            sttes_invalid; /* # of maps that
```

-continued

| | | |
|---|---|---|
| | | are invalidated. */ |
| u_int8 | extension_count; | /* # of times window has been extended. */ |
| vm_obj_p_off_t | offset_in_file; | /* File offset (in pages) of base. */ |
| struct vm_stte | *first_stte; | /* First referencing vm_stte. */ |
| struct vm_stte | *last_stte; | /* Last referencing vm_stte. */ |
| struct vm_window | *indirect; | /* If not NULL, indirect window. */ |
| vm_obj_p_off_t | last_fault_addr; | /* Last page fault offset (to disk). */ |
| u_int16 | run_length; | /* # of faults for sequential addrs. */ |
| struct vm_window | *next_obj_win; | /* Next window in object. */ |
| struct vm_window | *prev_obj_win; | /* Previous window in object. */ |
| struct vm_window | *next_window; | /* Next window in list. */ |
| struct vm_window | *prev_window; | /* Previous window in list. */ |
| vm_obj_p_off_t | low_addr_ref; | /* Lowest page referenced. */ |
| vm_obj_p_off_t | high_addr_ref; | /* Highest page referenced. */ |
| vm_obj_p_off_t | low_addr_mod; | /* Lowest page modified. */ |
| vm_obj_p_off_t | high_addr_mod; | /* Highest page modified. */ |
| vm_obj_p_off_t | low_addr_atomic; | /* Lowest page atomic. */ |
| vm_obj_p_off_t | high_addr_atomic; | /* Highest page atomic. */ |
| u_int8 | num_pnb; | /* # of page note blocks. */ |
| struct_vm_pnb | *first_pnb; | /* Window's first page note block. */ |
| struct_vm_pnb | *last_pnb; | /* Window's last page note block. */ |

] vm_window_t;
typedef
struct vm_win_list [

| | | |
|---|---|---|
| sem_t | lock; | /* Lock for window list. */ |
| u_int16 | num_windows; | /* # of windows in the list. |
| vm_window_t | *first_window; | /* First window in list. */ |
| vm_window_t | *last_window; | /* last window in list. */ |

] vm_win_list_t;

A preferred structure of STT's 84 and 86 and, more particularly, of STTE's 70A–70C and 72A, 72B, is presented below:

typedef
struct vm_stte [

| | | |
|---|---|---|
| stte_t | hardware_stte; | /* Hardware portion of vm_stte. */ |
| u_int8 | stte_loaded; | /* The STTE number in which this vm_stte is loaded. */ |
| vm_inherit_attr_t | inheritance; | /* Inheritance rules for STTE. */ |
| bool_t | extendable; | /* If true, map can be extended. */ |
| vm_obj_p_off_t | object_offset; | /* Page offset at which map starts. */ |
| u_int32 | length; | /* Length of the map. If zero, the map is invalid. */ |
| vm_window_t | *window; | /* Window to which this entry maps. */ |
| vm_obj_t | *object; | /* Object to which this entry maps. */ |
| struct vm_stte | *prev_proc_stte; | /* Previous vm_stte that maps to the same process. */ |
| struct vm_stte | *next_proc_stte; | /* Next vm stte that maps to the same process. */ |
| struct vm_stte | *prev_win_stte; | /* Previous vm_stte that maps to the same windows. */ |
| struct vm_stte | *next_win_stte; | /* Next vm stte that maps to the same window. */ |

] vm_stte_t;
typedef
struct vm_proc_stte_list [

| | | |
|---|---|---|
| u_int16 | num_sttes; | /* Number of text or data vm sttes. */ |
| vm_stte_t | *first_stte; | /* First vm stte in list. */ |
| vm_stte_t | *last_stte; | /* Last vm stte in |

-continued

```
]  vm_proc_stte_list_t;                              list. */
```

Object Management

Every regular file, e.g., file 80, that has a vnode associated with it also has an associated vm_object, e.g., object 78. Together, those objects form the VM system's object table, with each object comprising an entry in that table. As evident in the "Data Structures" section above, each object 78 includes one or more vm_windows 82 which, together, contain information about all of the SVA-to-file-range mappings for a single file. The VM system utilizes the object manager and its object management routines, detailed below, to initialize the object table, create and delete objects, manage the association of vm_window to objects, support copy-on-reference and checkpoint/restart requirements through the use of overlay objects.

An overlay object acts like a "shadow" behind a primary object. The primary object is the object, like vm_object 78, to which the VM system first looks when accessing data in a mapped file. For example, if a process attempts to read a page that does not exist in the primary object, then the VM system checks the associated overlay objects to see if one of them has the page. The overlay object may be read from, but it is never written to.

As an example, when a process is forked, the parent's data area is inherited by the child process. Both parent and child should initially see the same data. However any changes made by one process should not be visible to the other. Rather than copying the entire data area from the parent to the child, each page is only copied when it is referenced.

The way overlay object's achieve this is by making the original primary object into an overlay object serving two new primary objects, one for the parent and one for the child. Both new primary objects are initially empty. When either parent or child initially references a page from the data section and attempt is made to read that page from the associated primary object. This attempt fails because the primary file is empty. The VM system then searches the overlay objects to that primary, preferably, beginning with the most recent overlay, to find the requested page.

In one embodiment of the invention, if the requested page is found in overlay object, a copy of that page is transferred to the primary object for the requesting process. This is referred to as "copy-on-reference."

In a preferred embodiment, if the requested page is found in an overlay object, the request is satisfied by reference to the overlay object—so long as the request is for read-type access. If the request is for write-type access, the found Pages are copied to the primary object associated with the modifying process before writing. This is referred to as "copy-on-write."

In yet another preferred embodiment, requests for read-type access to data not in the primary are satisfied by reference to the overlay object until the process modifies any datum. At that time, the VM system begins to populate the primary object, with all further requests for either read-type or write-type access being satisfied by copying the requested data to the primary object. This is referred to as "copy-on-reference-after-first-write."

Figure 12A:
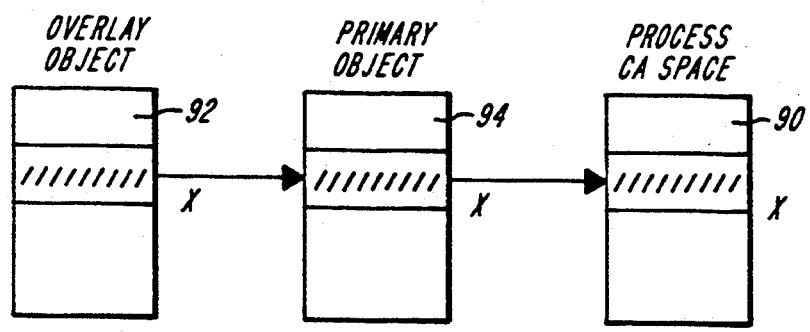
FIGS. 12A–12C illustrate how pages are copied and updated during forking by the digital data processor of FIG. 1.
Figure 12B:
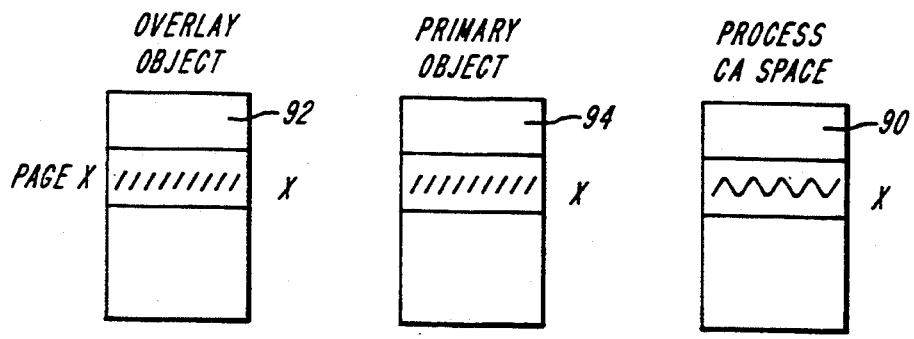
Figure 12C:
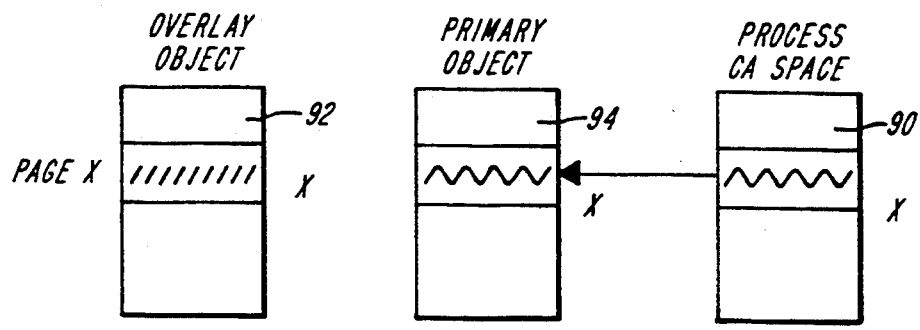

FIGS. 12A–12C illustrate how pages are copied and updated in the forking process described above. Particularly, in FIG. 12A, a process (not shown) requests access to a page, X. Because X is not initially present in the process's context address space 90, a fault is signalled. Consequently, the VM system copies the requested page from the overlay objects SVA 92 to the primary object's SVA 94. Once copied, page X is available to the process and can be copied to memory, i.e., its associated cache.

FIG. 12B illustrates the result of a modification of page X by the process. This is shown by the cross-hatching of that page as represented in CA space 90. As reflected in the drawing, the changes to X have not yet been written out to the primary object (nor to its associated disk file).

Referring to FIG. 12C, the process writes out modified page X. This occurs when a copy of the page is transferred from memory to the primary object 94. It will appreciated that, while the page is copied to the primary object 94, it is not copied to the overlay object 92.

To reduce paging, objects are not immediately destroyed when a file is closed. Instead the object and its vm_windows are marked as cached, but its vnode and SVA associations are maintained. If the object is still present when the file is next opened, the object and any of its remaining vm_windows will be reused. This allows direct use of any of the object's pages that were still in memory.

Figure 13A:
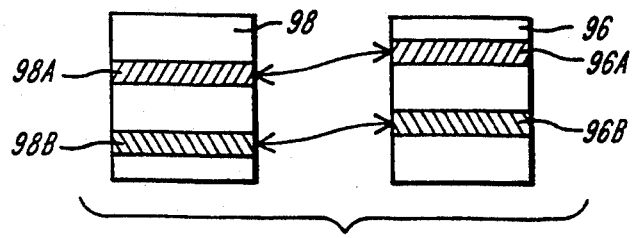
FIGS. 13A–13E illustrate checkpointing and forking the mechanisms as performed by the digital data processor of FIG. 1.

The data structures and mechanisms described above are used both for checkpointing as well as for forking, and permit the digital data processor 10 to provide improved checkpointing and forking. This is illustrated in FIGS. 13A–13E. Referring to FIG. 13A, the VM system provides a mapping between the context address space 96 of a process and its primary object 98. In the drawing, a page 96A of the CA space is mapped to a page 98A of the object, while another CA page 96B is mapped to object page 98B.

Figure 13B:
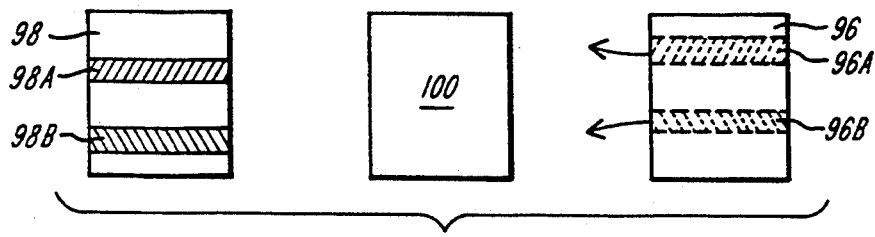

FIG. 13B illustrates the checkpointing process, wherein a new primary object 100 replaces the original object 98, and wherein the latter becomes an overlay object. Concurrently, the mapping between the CA space 96 and the objects is, at least temporarily, "lost." That is, although the table entries (STTE's) which relate to pages 96A, 96B are retained, their pointers to the previous primary object 98 are reset to point to "missing" pages in the new primary 100.

Figure 13C:
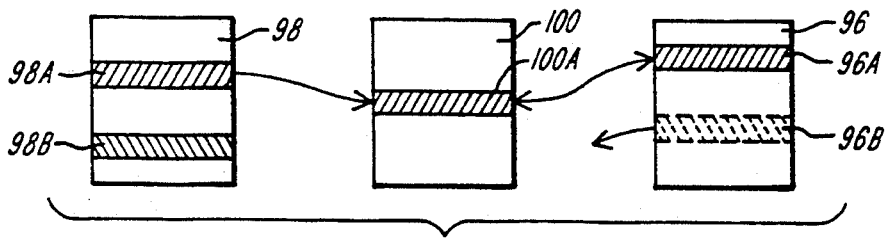

FIG. 13C illustrates the copying of data from the overlay object 98 to the primary object 100 in response to an access request by the process. Particularly, when the process makes a first reference to CA page 96A following the checkpoint, a missing page fault is signalled. The VM system responds to that fault by searching through the prior overlay objects, e.g., object 98, to locate the referenced page. Upon finding that page, e.g., page 98A, the VM system copies it to the current primary 100. Whereupon, the VM system completes the mapping between CA page 96A and the copied page 100A.

Figure 13D:
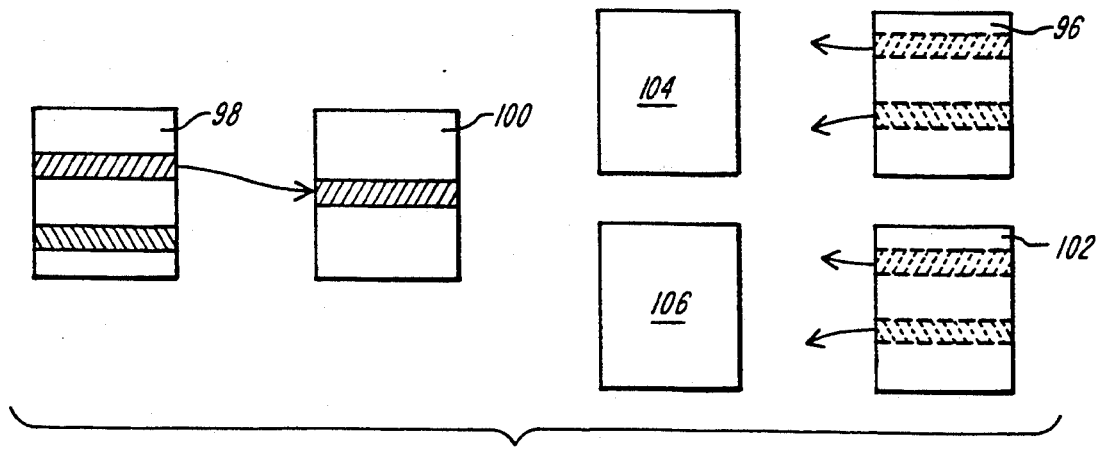

FIG. 13D shows how objects are utilized in the creation of a fork process. In the drawing, the CA space 96 for the parent process is duplicated to form CA space 102 for the child. Two further primary objects 104 and 106 are created for the parent and child, respectively.

At the same time, objects 98 and 100 form a chain of overlay objects for both processes. As above, the STTE's of the processes are modified to point to missing pages within the respective primary objects 104, 106.

Figure 13E:
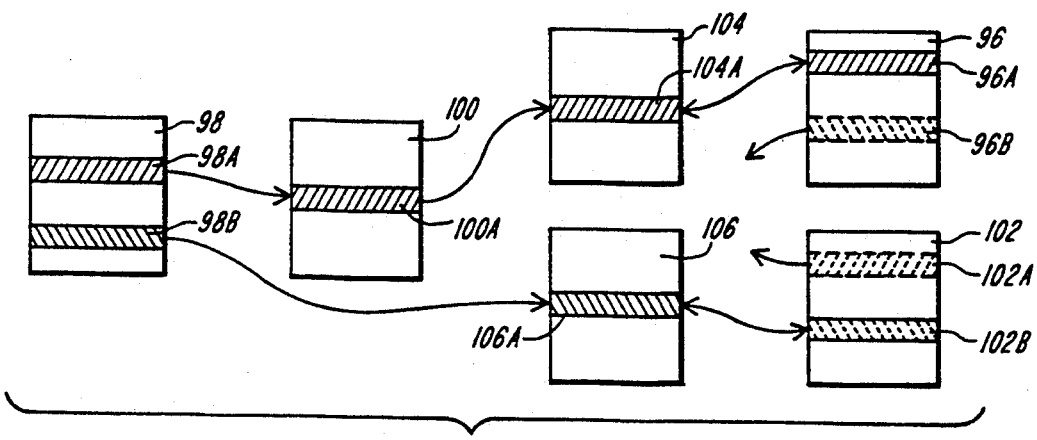

FIG. 13E illustrates the copying of pages into the primary objects 104, 106 upon reference by the parent and child processes. Particularly, upon reference to CA page 96A, the parent process faults, causing the VM system to search for the requested page in the overlay object chain 98, 100, preferably, progressing from most recent (object 100) to oldest (object 98). Upon finding the page 100A, the VM system copies it to from overlay object 100 to the primary 104. Likewise, upon reference to CA page 102B, the child process faults, forming the VM system to search the overlay object chain. Upon finding the requested page in overlay object 98, the VM system copies the corresponding page 98B to the primary 106.

In a preferred embodiment of the invention, the VM system performs a checkpoint or fork, for example, upon command of the operator, upon the occurrence of a scheduled event, or upon instruction by an executing process.

Window Management

As noted above, each vm_window represents an association of a specific range of a file with a specific range of SVA. The VM system relies on the window manager, and the vm_window management procedures, detailed below, to create vm_windows, maintain the association between SVA's and vm_windows (avoiding overlaps, collapsing abutting vm windows, etc.), maintain vm_window reference counts, extend vm_windows, and multiplex vm_windows.

With respect to window extension, when a window is extended it usually will not be possible to extend its SVA. Instead a new chunk of SVA, large enough to accommodate the extended window, will need to be allocated. This must be done without having one page of the mapped file correspond to multiple pages of SVA. It is also not possible to just change the SVA range that corresponds to the window since the old range may be included in process maps (vm sttes). Therefore a new window with the new, larger SVA range is created. All resident page of the old window are moved (the address in the page descriptor is changed) to the new window. An old window is marked as an indirect window and a pointer to the new window is set in it. When a process tries to reference an address in the old SVA range, it will fault. When the fault handler looks sees that the window is indirect, it maps it out and maps in the new window with the larger SVA range.

The vm_window manager also maintains information about pages in special circumstances by associating special notes with the pages. For example, a page that is "locked" for pending I/O will have a page note indicating if is held-for-read or held-for-write. This enables the VM system to react correctly if a process faults for that page. In this case, the process should be blocked pending completion of the I/O. Only pages in a special state have a page not associated with them.

The page notes are grouped into blocks representing a small number of contiguous SVA pages. These blocks are lined together in ascending SVA order. Whenever a page fault occurs, a check is made to see if the page has a page-note indicating that it is in a special state. If not, a page-note is created, and the fault is processed. When the I/O is completed that page-note is cleared.

Process & Context Management Procedures

The VM system manages each process's CA space, and STTE's. Preferably, this is accomplished by modifying a number of the standard OSF/1 procedures in the manner described below.

In so managing the CA address space, the VM system preferably provides additional interfaces provided to allow the user to examine the change in inheritance attributes of segments (e.g., inherit/don't inherit and shared/private), as well as to "mapin" or "mapout" sections of files.

To improve the performance of VM_FORK, and reduce paging, the VM system only copies pages of non-shared segments as they are referenced, a procedure typically referred to as "copy-on-reference." In an alternative embodiment, the VM system only copies such pages by after an attempt is made to write to the file, i.e., "copy-on-reference-after-first-write."

The digital data processing 10 and, particularly, the central processing units 40A-40C execute the steps contained in the procedures below, which form part of the VM system, in order to manage process and context data structures. Where applicable, these steps are represented as changes to existing procedures in the preferred operating system, OSF/1.

VM STTE INVALIDATE

The VM system executes the steps of the procedure VM_STTE_INVALIDATE to invalidate an STTE, e.g., 84A. This is done as part of the process of swapping out a window. If the procedure is the last use of a window, it places the window on the swapped list. VM_STTE_INVALIDATE accepts as input the STTE to invalidate.

A preferred sequence of steps of VM_STTE_INVALIDATE are set forth below.

Operation

Get the window pointer from the stte.
Mark the vm_stte as invalid.
Use VM_STTE_CLEAR to invalidate the STTE if it is in the STT.
Lock the window.
Increment the sttes_invalidated count.
If sttes_invalidated equals the reference count, then this is the last process to invalidate its STTE, so place the window on the swapped list.
Unlock the window.

VM_STTE_REVALIDATE

The VM system executes the steps of VM_STTE_REVALIDATE to update an STTE, e.g., 84A, for a process. This procedure is called after the window associated with the STTE has been swapped out, then swapped back in. The procedure accepts as input the STTE requiring updating.

A preferred sequence of steps of VM_STTE_REVALIDATE is set forth below.

Operation

Look in the STTE to get the window that has been swapped in.
Lock the window.
Get the new base SVA address for the window.
Update the hardware part of the STTE.

Unlock the window.

EXIT

The VM system executes the steps of the procedure EXIT to release a processes's resource. In a preferred practice of the invention. This procedure is implemented by modifying the conventional OSF/1 procedure EXIT to ensure that text as well as files are closed in the loop that closes files. The modifications do not add new input or output parameters to the procedure call.

VM_FORK

The VM system executes the steps of the procedure VM_FORK to duplicate a parent process's virtual memory information for a child process. In a preferred practice of the invention, the procedure is implemented by modifying the conventional OSF/1 procedure VM_FORK in the manner described below. The modifications do not add new input or output parameters to the procedure call.

The preferred modifications are as follows:
Remove explicit assignment of SVA. This is done automatically when the parent's segments are duplicated or mapped for the child.
Remove code which holds child structures.
Remove code which unmaps per-process kernel area.
Remove call to XLINK. This will be handled like other segments.
Remove code that kills duplicated segments.
Modify per-process segment loop to do the following for each of the Parent's vm_sttes:
  A) If the segment is shared inheritable, call VM_MAPIN with the child's process i.d. (pid) to map it for the child process.
  B) If the segment is private inheritable, do:
    i) Call the (UNIX) File System to create an unnamed file for the segment.
    ii) Call the File System to open the file.
    iii) Call VM_OBJ_CREATE_OVERLAY to associate the new file with an overlay of the original.
    iv) Call VM_MAPIN with this process's pid to mapin the overlay object.
  C) If the segment is not inheritable, cycle.

SYSCALL_FINISH_FORK

The VM system executes the steps of the Procedure SYSCALL_FINISH_FORK to complete the fork in a child process. In a preferred practice of the invention, the procedure is implemented by modifying the conventional OSF/1 procedure SYSCALL_FINISH_FORK in the manner described below. The modifications do not add new input or output parameters to the procedure call.

The preferred modifications are as follows: For each inherited file that is not shared do:
  A) Call the (UNIX) File System to create an unnamed file for the segment.
  B) Call the File System to open the file.
  C) Call VM_OBJ_CREATE_OVERLAY to associate the new file with an overlay of the original.
  D) Call VM_MAPIN with this process's pid to mapin the overlay object.

GETXFILE

The VM system executes the steps of the procedure GETXFILE to complete the fork in a child process. In a preferred practice of the invention, the procedure is implemented by modifying the conventional OSF/1 procedure GETXFILE in the manner described below. The modifications do not add new input or output parameters to the procedure call.

The preferred modifications are as follows:
Remove test for sufficient swapspace, leaving checks for individual resource limits in place.
Remove code that copies the initialized data to the swap file.
Replace call to the UNIX procedure XALLOC with the following:
  A) Call the File System to open the executable file.
  B) Call mapin to create a map for the executable file.

EXEC_DATA_STACK

The VM system executes the steps of the procedure EXEC_DATA_STACK to create, open and map in unname files associated with a processes's stack and local data. This procedure is implemented by modifying the conventional OSF/1 procedure EXEC_DATA_STACK to ensure that text as well as files are closed in the loop that closes files. The modifications do not add new input or output parameters to the procedure call.

The preferred modifications are set forth below:
Remove virtual memory temporary locks.
Replace the calls to VM_MAKE_KNOWN with calls to the (UNIX) file system to create the unnamed files.
Add calls to the file system to open the new files. This will cause vm_objects to be created (if needed).
Replace the calls to the procedure VM_MAP with calls to the procedure VM_MAP_OBJ, specifying that the segments should be inherited on forks but not shared. Thus, defining the stack and data as copy-on-reference segments.
Remove the call to expand.
Redo the error condition cleanup.
Replace the call to VM_UNMAP with VM_OBJ_MAP.
Replace the calls to VM_MAKE_KNOWN with file system calls to close the files.
Remove the calls to VM_EXPAND.

VM_RELEASE_ALL_USER

The VM system executes the steps of the procedure VM_RELEASE_ALL_USER to unmap all of a process's user code and text space. In a preferred practice of the invention. This procedure is implemented by modifying the conventional OSF/1 procedure VM_RELEASE_ALL_USER to ensure that text as well as files are closed in the loop that closes files. The modifications do not add new input or output parameters to the procedure call.

The preferred modifications are set forth below:
Remove the map search for kernel segments (after removing the back frame pointer).
Remove call to XFREE.
Replace the call to XFREE and the data unmap loop with the following:
  A) For each data and text vm_stte do:
    i) Get the vm_window identifier from the vm_stte.
    ii) Call VMMAPOUT with the vm_stte and the vm_window identifier.

MAPIN

The VM system executes the steps of MAPIN to map a file to a region of the CA space of a process. The procedure accepts as input the file's descriptor, offset, length, as well as the inheritance attributes of the associated STTE, the object's map type and a boolean value indicating whether atomic transactions are enabled for the object. Optionally, the procedure also accepts as input a pointer to the context address. The procedure returns as output a map identifier handle, as well as the status of the mapping operation.

A preferred sequence of steps of MAPIN is set forth below.

Operation

If map_type is VM_TEXT_OBJECT and atomic transactions are enabled, return the invalid argument exception (EINVAL).

If the context address is not NULL do:
A) Make sure that address MOD length is zero. If not, return the exception VM_ADDRESS_NOT_ALIGNED.

Call VM_MAPIN to map the file to this process.

VM_MAPIN

The VM system executes the further steps of VM_MAPIN to map a file to a region of the CA space of a process. As above, the procedure accepts as input the file's descriptor, offset, length, as well as the inheritance attributes of the associated STTE, the object's map type and a boolean value indicating whether atomic transactions are enabled for the object. Optionally, the procedure also accepts as input a pointer to the context address. The procedure returns as output a map identifier handle, as well as the status of the mapping operation.

A preferred sequence of steps of VM_MAPIN is set forth below.

Operation

If the context address is not NULL do:
A) Check all vm_sttes to make sure the address is not taken. If it is, return the exception VM_ADDRESS_IN_USE.
Otherwise do:
A) Search the mapowner's data vm_stte's to find a free block of CA space of the correct size and alignment.
B) If not found, return the exception VM_NOT_ENOUGH_MEMORY.

Set status to VM_NORMAL.

Call the File System to get the object identifier for the file descriptor.

Call the UNIX procedure KERNMALLOC to get a free vm_stte.

Initialize the inheritance, extendable, and length fields of the vm_stte.

Put the object identifier in the vm_stte.

Call VM_OBJ_MAP with the object entry, offset, length, vm stte address, and atomic enabled flag, to map the object.

If VM_OBJ_MAP returns VM_OBJ_TYPE_INVALID, do:
A) Call the UNIX procedure KERNFREE to release the vm_stte.
B) Return the text file busy exception (ETXTBSY).

Store the base SVA returned by the object manager in the vm_stte.

Use VM_STTE_LINK to link the new vm_stte to the appropriate process vm_stte_list.

If the map_owner is this process, initialize the hardware_stte in the vm_stte.

MAPOUT

The VM system executes the steps of MAPOUT as a user entry for mapping out a file range from a process's context address space. The procedure accepts as input a handle of the map, and returns a status of the mapping procedure.

Preferred steps for the procedure VM_MAPOUT are set forth below:

Operation

Set status to VM_NORMAL.

Check each of the process's data vm_sttes for a match to the map handle.

If no match is found, return the exception VM_INVALID_MAP_HANDLE.

Get the vm_window identifier from the vm_stte.

Call VM_MAP_OUT with the vm_stte and the vm_window identifier.

VM_MAPOUT

The VM system executes the further steps of MAPOUT when processing a user mapout request and when terminating a process. The procedure accepts as input the identifier of a vm_stte, and returns a status of the mapping procedure.

A preferred sequence of steps for the procedure VM_MAPOUT is set forth below:

Operation

Set status to VM_NORMAL.

Call vm_obj_unmap with the vm_window and vm_stte to map out the window.

Call vm_stte_free to invalidate the vm_stte and release the vm_stte.

VM STTE FREE

The VM system executes the steps of VM_STTE_FREE to release a vm_stte when mapping out a region of a process. The procedure accepts as input the identifier of the vm_stte to release.

Preferred steps for the procedure VM_STTE_FREE are set forth below:

Operation Use VM_STTE_CLEAR to remove the STTE if it is in the STT.

If this is a data vm_stte, then proc_list is process's data vm_stte list; otherwise, it is the process's text vm_stte list.

If vm_stte.prev_proc_stte is NULL, set proc_list.first_stte to vm_stte.next_proc_stte. Otherwise, set the vm_stte.next_proc_stte of the previous vm_stte to vm_stte.next_proc_stte.

If vm_stte.next_roc_stte is NULL, set proc_list.last_stte to vm_stte.prev_proc_stte. Otherwise, set the prev_proc_stte field of the next vm_stte to vm_stte.prev_proc_stte.

Call the UNIX procedure kern_free to release the memory associated with the vm_stte.

VM_STTE_LINK

The VM system executes the steps of VM_STTE_LINK to link an vm_stte into the appropriate spot of a process's lists of vm_stte's. The procedure accepts as input pointers to the vm_stte and the process list of vm_stte's.

A preferred sequence of steps of VM_STTE_LINK are set forth below:

Operation

Search the list until an entry with a higher Context Address (next_stte) is found. The new entry will be inserted just prior to it.

Set vm_stte.next_proc_stte to next_stte.
Set vm_stte.prev_proc_stte to next_stte.prev_proc_stte.
Set next_stte.prev_proc_stte to the new vm_stte.
Set the next_proc_stte field of the previous vm_stte to the new vm_stte.

VM_STTE_FIND

The VM system executes the steps of the macro procedure VM_STTE_FIND to locate a vm_stte that contains a specified address. The procedure accepts as input the address of interest. It returns a pointer to the vm_stte and a status code indicating the success of the locate operation.

Figure 14:
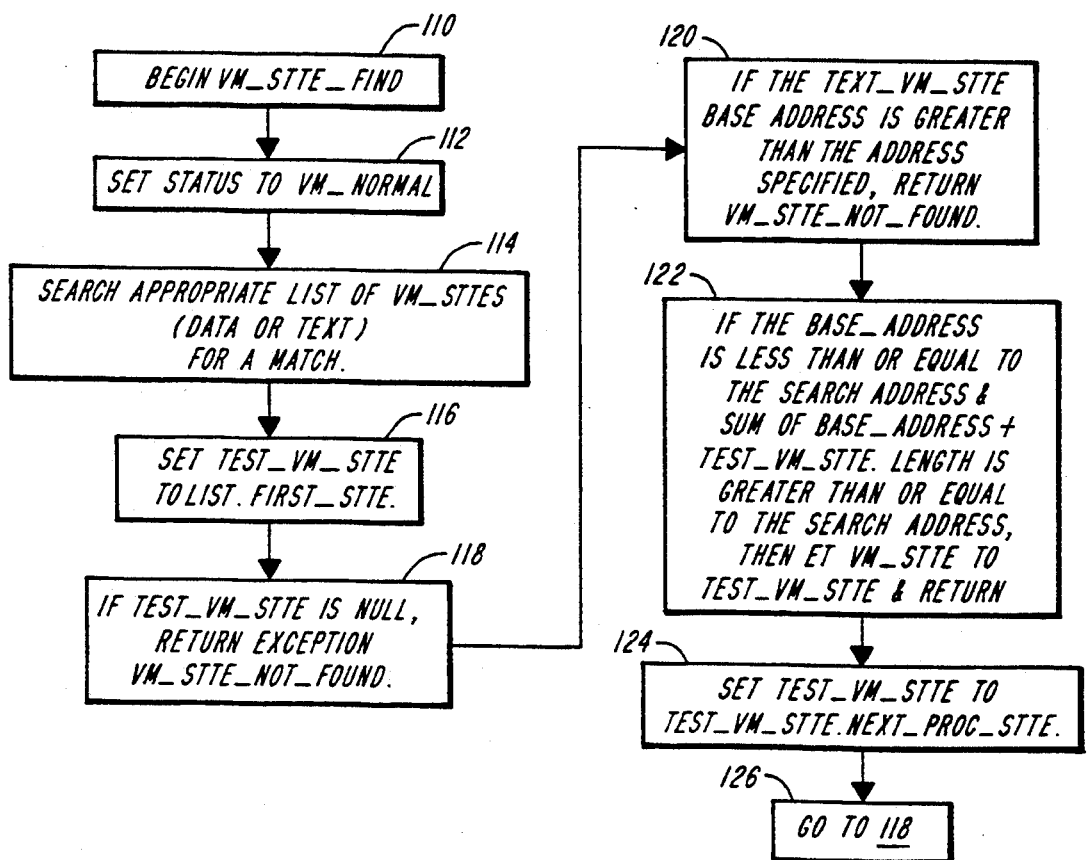
FIG. 14, Sheets 1–2, depict a preferred sequence of steps of VM_STTE_FIND.

A preferred sequence of steps of VM_STTE_FIND is set forth below and depicted in FIG. 14, beginning with step 110:

Operation

Set status to VM_NORMAL (step 112).
Determine if the address is in data space or text space. Use the appropriate list of
vm_sttes when searching for a match (step 114).
Set test_vm_stte to list.first_stte (step 116).
If test_vm_stte is NULL, return exception VM_STTE_NOT_FOUND (step 118).
If the text_vm_stte base address is greater than the address specified, return the exception VM_STTE_NOT_FOUND (step 120).
If the base_address is less than or equal to the search address and the sum of baseaddress+test_vm_stte.length is greater than or equal to the search address do:
A) Set vm_stte to test_vm_stte,
B) Return (step 122).
Set test_vm_stte to test_vm_stte.next_proc_stte (step 124).
Go back to the fourth step, i.e., step 118.

VM_STTE_LOAD

The VM system executes the steps of the procedure VM_STTE_LOAD to load the hardware part of a vm_stte into the appropriate STT. It accepts as input a pointer to the vm_stte to load.

Figure 15:
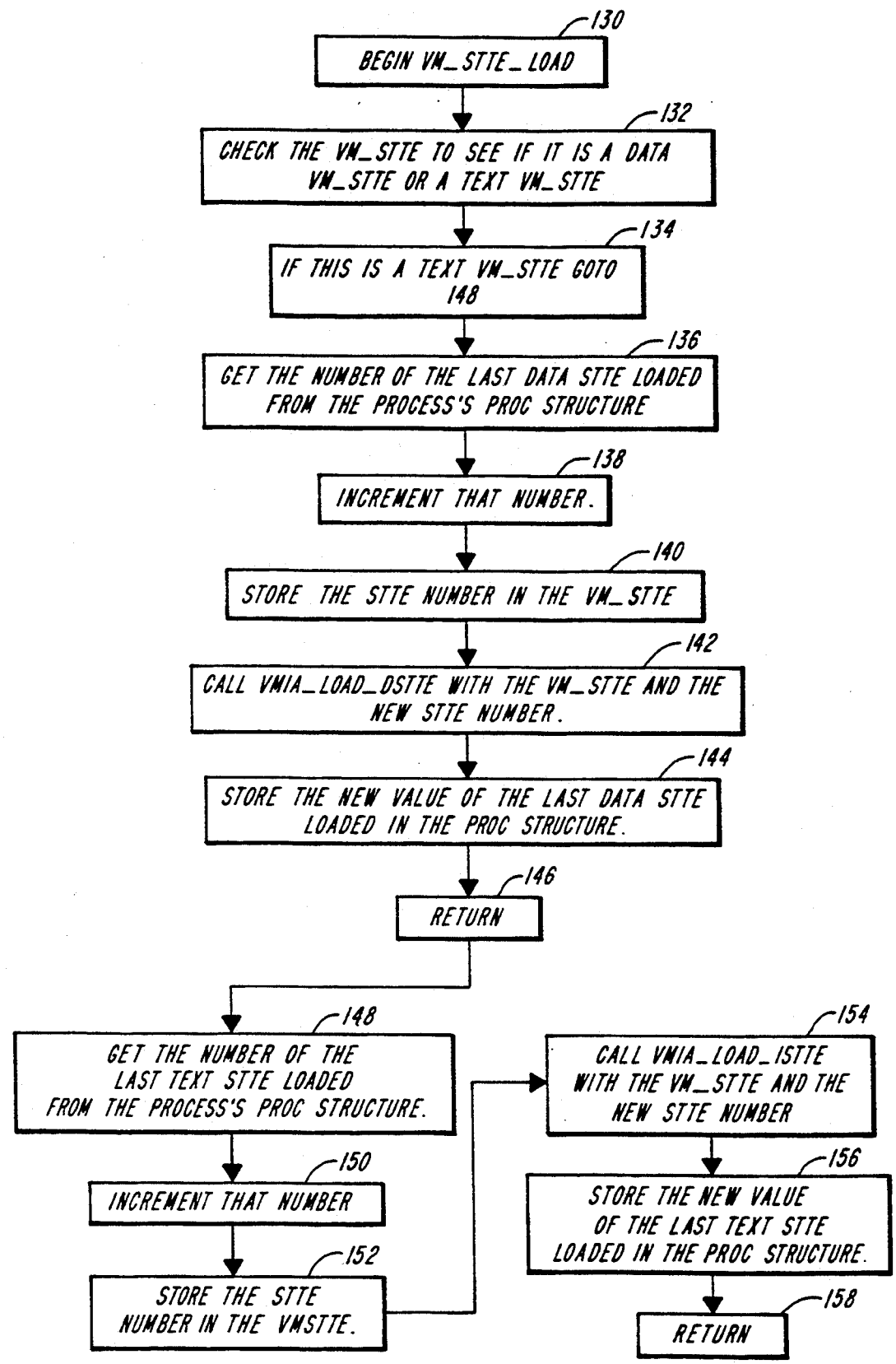
FIG. 15, Sheets 1–3, depicts a preferred sequence of steps of VM_STTE_LOAD.

A preferred sequence of steps of VM_STTE_LOAD is set forth below and depicted in FIG. 15, beginning with step 130:

Operation

Check the vm_stte to see if it is a data vm_stte or a text vm_stte (step 132).
If this is a data vm_stte do:
A) Get the number of the last data stte loaded from the process's proc structure (step 136).
B) Increment that number (step 138).
C) Store the STTE number in the vm_stte (step 140).
D) Call vmia_load_dstte with the vm_stte and the new STTE number (step 142)
E) Store the new value of the last data stte loaded in the proc structure (step 144).
Otherwise (this is a text vm_stte) do:
A) Get the number of the last text stte loaded from the process's proc structure (step 148).
B) Increment this number (step 150).
C) Store the STTE number in the vm_stte (step 152).
D) Call vmia_load_istte with the vm_stte and the new STTE number (step 154).
E) Store the new value of the last text stte loaded in the proc structure (step 156).

VM_STTE_CLEAR

The VM system executes the steps of the procedure VM_STTE_CLEAR to load the hardware part of a vm_stte into the appropriate STT. It accepts as input a pointer to the vm_stte to load.

Figure 16:
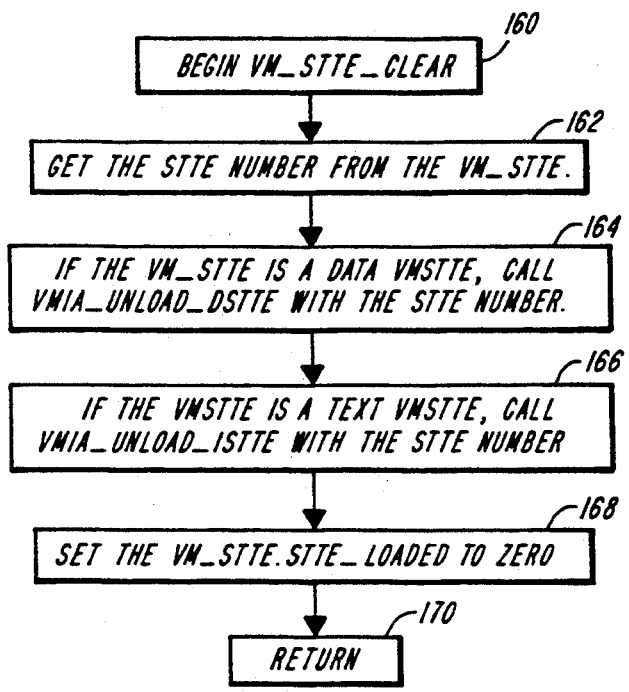
FIG. 16 depicts a preferred sequence of steps of VM_STTE_CLEAR.

A preferred sequence of steps of VM_STTE_CLEAR is set forth below and depicted in FIG. 16, beginning with step 160:

Operation

Get the STTE number from the vm_stte (step 162).
If the vm_stte is a data vm stte, call vmia_unload_dstte with the STTE number (step 164).
If the vm stte is a text vm stte, call vmia_unload_istte with the STTE number (step 166).
Set the vm_stte.stte_loaded to zero (step 168).

Object Management Procedures

The digital data processing 10 and, particularly, the central processing units 40A-40C execute the steps contained in the procedures below, which form part of the VM system, below in order to manage objects.

VM_OBJ_INIT

The VM system executes the steps of the procedure VM_OBJ_INIT to initialize the object table. It is called during system initialization prior to creation of any objects. A preferred sequence of steps of VM_OBJ_INIT are set forth below.

Operation

Call spin_init for the cached_list_lock;
If spin_init failed, call panic.
Set num_cached_objects to 0.
Set first_cached_object to NULL.
Set last_cached_object to NULL.

VM_OBJ_CREATE

The VM system executes the steps of the procedure VM_OBJ_CREATE to create a new object which is associated with a vnode. It is called by the file system when associating a vnode with a mapped file. VM_OBJ_CREATE accepts as input an identification of the vnode and the object type. It returns a pointer to the object and the status.

A preferred sequence of steps of VM_OBJ_CREATE is set forth below.

Operation

Set status to VM_NORMAL.
Call vm_obj_entry_get to get a free object entry.
Set object_type in the object according to the input parameter.

Read the all_timer for the cell.
Mask out all but the low 7 bits of the time.
Multiply the result of the previous step by the page size. This gives the offset of the file to the object.
If the object_type is text, subtract VM_TEXT FI-LE_OFFSET from the file offset.
Set object offset_in_file to the offset as calculated.
Set mapped_file to the file's vnode.
Set state in the object_type to active.

VM_OBJ_ENTRY_GET

The VM system executes the steps of the procedure VM_OBJ_ENTRY_GET to allocate and initialize an object entry. It is called when creating a new object. VM_OBJ_ENTRY_GET accepts returns as output a pointer to an and the status.

A preferred sequence of steps of VM_OBJ_ENTRY_GET is set forth below.

Operation
Set status to VM_NORMAL.
Call kern_malloc, without waiting, to allocate memory for an object.
If an object entry is still needed (kern malloc failed), do:
  A) Lock vm_obj_cached.
  B) If vm_obj_cached.num_objects is 0 do
    i) Unlock to vm_obj_cached.
    ii) Call kern_malloc with wait option specified.
  Otherwise, do
    i) vm_obj_cached[firstobject] is the selected object.
    ii) Unlock the vm_obj_cached.
    iii) Call vm_obj_delete to free the selected object.
  C) Go back to the second step (i.e., calling kern_malloc).
Call spin_init to initialize the object's lock.
Set next_obj and prev_obj to NULL.
Set low_addr_mapped and high_addr_mapped to 0.
Set num_windows and offset_in_file to 0.
Set mapped_file and atomic_state_file pointers to NULL.
Set the object and window pointers to NULL.

VM_OBJ_ACTIVATE

The VM system executes the steps of the procedure VM_OBJ_ACTIVATE to move an object from the cached list to the active entry list. This procedure is called by the file system to let the VM system know that an object should be on the active list. VM_OBJ_ACTIVATE accepts as input an pointer to the object. It returns the status.

A preferred sequence of steps of VM_OBJ_ACTIVATE is set forth below.

Operation
Set status to VM_NORMAL
Lock the object entry.
If the object's state is not cached do:
  A) Call spin_unlock to unlock the object entry.
  B) return the exception VM_OBJ_NOT_CACHED.
Call spin-lock with no_wait set to lock vm obj_cached. If the call is not successful, do:
  A) Call spin_unlock to unlock the object entry.
  B) Go back to the second step.
Use VM_OBJECT_UNLINK to unlink the object from vm_obj_cached.
Set the object's state to active.
Call spin_unlock to unlock vm_obj_cached.
For each window in the object call vm_window activate.
Call spin_unlock to unlock the object entry.

VM OBJ CREATE OVERLAY

The VM system executes the steps of the procedure VM_OBJ_CREATE_OVERLAY to create an overlay object for use in checkpointing and restarting, and in writing to a file that is being executed elsewhere. z This procedure is called by the file system. VM_OBJ_CREATE_OVERLAY accepts as input a pointer to the object, the vnode of the overlay file, and the object type. It returns a pointer to a new object, and a status indicator.

Figure 17:
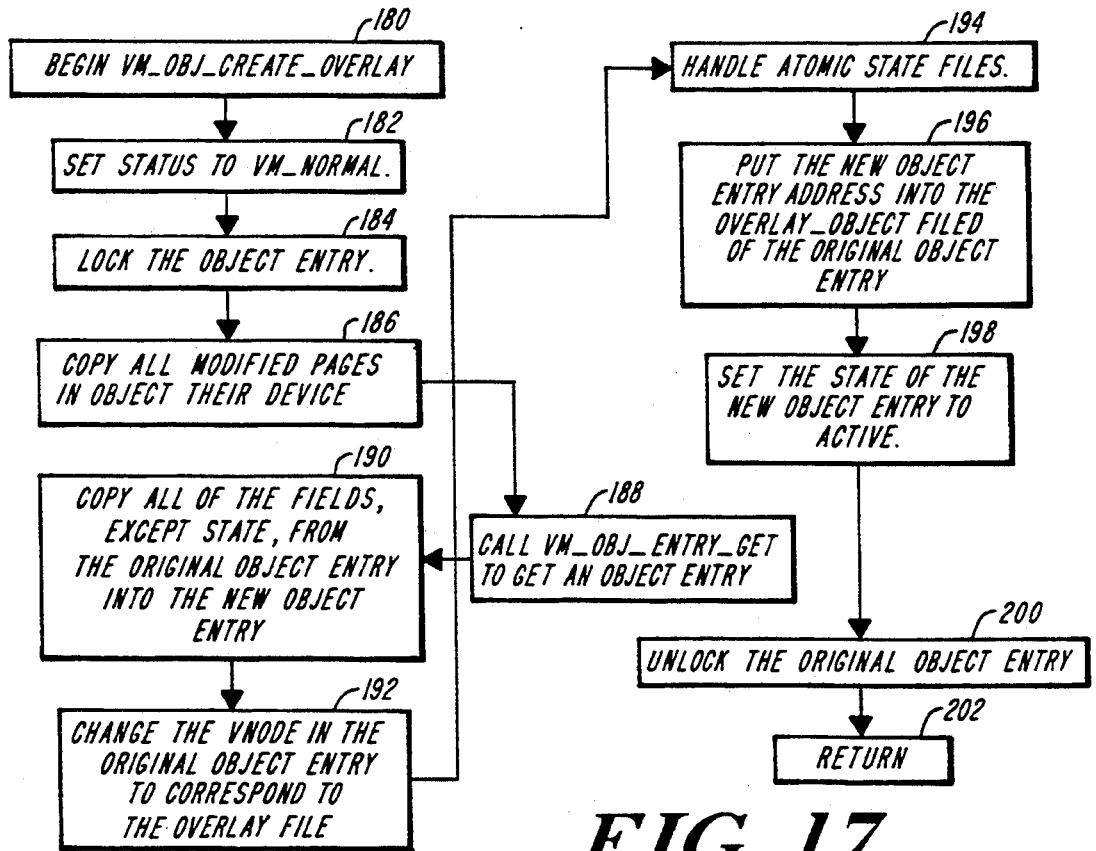
FIG. 17, Sheets 1–3, depict a preferred sequence of steps of VM_OBJ_CREATE_OVERLAY.

A preferred sequence of steps of VM_OBJ_CREATE_OVERLAY is set forth below, and depicted in FIG. 17, beginning with step 180. With respect to the cited atomic-file steps, see copending commonly assigned application Ser. No. 763,368, entitled "DIGITAL DATA PROCESSOR WITH IMPROVED PAGING," filed this day herewith, Sep. 20, 1991.

Operation
Set status to VM_NORMAL (step 182).
Call spin-lock to lock the object entry (step 184).
For each window in the object call vm_window_clean_pages with the flush pages flag set. This ensures that all modified pages are copied to their device (step 186).
Call vm_obj_entry_get to get an object entry (step 188).
Copy all of the fields, except state, from the original object entry into the new object entry (step 190).
Change the vnode in the original object entry to correspond to the overlay file (step 192).
If the original object entry had an atomic state file, do:
  A) Call vm_atomic_state_file_create to create a new atomic state file.
  B) Store the vnode of the new atomic state file in the original atomic state file (step 194).
Put the new object entry address into the overlay_object filed of the original object entry (step 196).
Set the state of the new object entry to active (step 198).
Call spin-unlock to unlock the original object entry (step 200).

VM_OBJ_CACHE

The VM system executes the steps of the procedure VM_OBJ_CACHE to move an object from the active list to the cache list. Any windows associated with the object are also cached. The procedure is called from the file system to let the VM system know that an object should be on the cached list. It should be called on the last close of a file where the vnode will remain cached. VM_OBJ_CACHE accepts as input a pointer to the object, and returns a status indication.

A preferred sequence of steps of VM_OBJ_CACHE is set forth below.

Operation
Set status to VM NORMAL.
Call spin_lock to lock the object entry.
Check the reference count of each window in the object. If any are greater than zero do:

A) Call spin_unlock to unlock the object entry.
B) Return the exception VM_WINDOW_IN_USE.

For each window call vm_window_cache.
Call vm_atomic_stat_file_destroy.
Call spin_lock to lock vm_obj_cached.
Use VM_OBJECT_LINK to link the object to vm_obj_cached.
Call spin_unlock to unlock vm_obj_cached.
Call spin_unlock to unlock the object entry.

VM_OBJ_DELETE

The VM system executes the steps of the procedure VM_OBJ_DELETE to delete an object, optionally flushing any of its modified pages The procedure also invalidates any of the object's pages that are still on the system. It is called by the file system on the last close of a temporary file and when it needs to free a vnode. It is also called by the VM system to delete a cached object. This occurs, for example, when there is no SVA space available and as part of the regular background clean-up process.

VM_OBJ_DELETE accepts as input a pointer to the object and a value indicating whether to flush pages. It returns a status indication. A preferred sequence of steps of VM_OBJ_DELETE is set forth below.

Operation

Set status to VM_NORMAL.
Call spin_lock to lock the specified object entry.
Check the reference count of each window in the object. If any are greater than zero do:
A) Call spin_unlock to unlock the object entry.
B) Return the exception VM_WINDOW_IN_USE.

If the object's state is cached, use VM_OBJECT_UNLINK to remove the object entry from the cached object list.
Change the state field in the object to deleted.
For each window do:
A) Call vm_window_delete, passing on the flush_pages option, to release the window entry.
B) deallocate the window's SVA.
Call vm_atomic_state_file_destroy.
Call spin_unlock to unlock the object entry.
Call vm_close to decrement the vnode reference count.
Call kern_free to release the object entry.
If the object had an overlay object do:
A) Call spin_lock to lock the overlay object.
B) Decrement the overlay_count in the overlay_object.
C) Call spin_unlock to unlock the overlay object.
D) If the overlay_count went to zero, call vm_obj_delete with the overlay object.

VM_OBJ_LINK

The VM system executes the steps of the procedure VM_OBJ_LINK to link an object entry into an object list. It is called by the VM system when creating, activating or caching an object. VM_OBJ_LINK accepts as input an a pointer to the object and to the list into which that object is to be linked.

A preferred sequence of steps of VM_OBJ_LINK is set forth below.

Operation

Set object.prev_obj to 1st.lastobject.
Set object.next_obj to NULL.
Set list.last_object to this object's address.
If object.prev_obj is NULL, set list.first_object to this object's address. Otherwise, set the nextobj field of what used to be the 1st object to point to this object.
Increment list.num_objects.

VM OBJ UNLINK

The VM system executes the steps of the procedure VM_OBJ_UNLINK to unlink an object entry from an object list. It is called by the VM system when activating, caching or destroying an object. As with VM_OBJ_LINK, the object entry and list must be locked by the calling routine. VM_OBJ_UNLINK accepts as input pointers to the object entry and to the object list.

A preferred sequence of steps of VM_OBJ_UNLINK is set forth below.

Operation

If object.prev_obj is NULL, set list.firstobject to object.nextobj. Otherwise set the next_obj field of the previous object to object.next_obj.
If object.next_obj is NULL, set list.lastobject to object.prevobj. Otherwise, set the prev_obj field of the next object to object.prev_obj.
Set object.next_obj to NULL.
Set object.prev_obj to NULL.
Decrement list.num_objects.

Window Management Procedures

The digital data processing 10 and, particularly, the central processing units 40A-40C execute the steps contained in the procedures below, which form part of the VM system, below in order to manage windows.

VM_WINDOW_INIT

The VM system executes the steps of the procedure VM_WINDOW_INIT to initialize the vm_window_table, active window lists, cached window lists and the swapped list. This procedure is preferably called during system initialization prior to mapping any files or initializing any mapped STTE's. A preferred sequence of steps of VM_WINDOW_INIT is set forth below.

Operation

For each active list, do:
A) Call spin_init for the active_list lock.
B) If spin_init failed, call panic.
C) Set num_windows in the list to zero.
D) Set first_window and last_window in the list to NULL.

Call spin_init for the vm_windows_cached lock.
If spin_init failed, call panic.
Set num_windows in the cached list to zero.
Set first_window and last_window in the cached list to NULL.
Call spin_init for the swapped_list.
If spin_init_failed, call panic.
Set num_windows in the swapped window to zero.
Set first_window and last_window in the swapped list to NULL.

VM_WINDOW_CREATE

The VM system executes the steps of the procedure VM_WINDOW_CREATE to create a new window, associating a range of SVA with a range of file offsets. The procedure is called by the VM system when mapping in a file (or restructuring an object's windows). The procedure accepts as input a pointer to the object, its offset, the page length, access mode, and a boolean indicating whether the window is extendable. The procedure returns a pointer to the new window and a status indication.

A preferred sequence of steps of VM_WINDOW_CREATE is set forth below.

Operation

Set status to VM NORMAL.
For each window in the object do:
A) If the window encompasses the entire section of the file specified in this call (by the base_file_offset and length), return the exception VM_WINDOW_ALREADY_MAPPED along with the windows address.

If this window contains the highest mapped address in the object, and atomic_enabled is set, call the file system to extend the atomic state file (allocate physical blocks) to a size that covers the new addresses.

Call vm_win_get_free_entry to get a free (and initialized) window entry.

Call spin_lock to lock the new window.

Call vm_sva_allocate to allocate a block of SVA for the window.

Store the SVA base address and length in the window entry's basesva field and window_length fields, respectively.

Put the object's address in the window entry.

Set the offset_in_file field of the window entry as specified.

Use VM_WINDOW_OBJ_LINK to add the vm_window to the object's window list.

Use VM_ADDR_TO_WIN_LIST to determine on which active list the new window will go.

Call spin_lock to lock the appropriate active window list.

Use VM_INK_WINDOW to add the new window to the active list.

Call spin_unlock to unlock the active list.

Check if any existing windows, that aren't indirect, are encompassed by the new window. If so, for each of the old windows do:
A) Call spin-lock to lock the old window.
B) If the old window had atomic enabled, set it in the new window.
C) For each page within the range of low_addr_ref and high_addr_ref do:
  i) Use VM_PAGE_NOTE_GET to see if the page has a page note. If so, and it indicates that the page is held for read or write, cycle.
  ii) Call vm_page_descr_mod to change the address in the page's descriptor to correspond to the page's new SVA.
D) Put the new window's address into the indirect field of the old window.
E) Call spin-unlock to unlock the old window.
Call spin_unlock to unlock the new window.

VM_WINDOW_SWAP_OUT

The VM system executes the steps of the procedure VM_WINDOW_SWAP_OUT to swap out a window as part of multiplexing the SVA space. It is called by the VM system and accepts as input a pointer to the window. It returns the sva and a status indicator.

A preferred sequence of steps of VM_WINDOW_SWAP_OUT is set forth below.

Operation

Set status to VM_NORMAL.
Call spin_lock to lock the selected window.
Check the window's state. If it is not active, do:
A) Call spin_unlock to unlock the window.
B) Return the exception VM_WINDOW_NOT_ACTIVE.
Set the window's state to pending_swapped.
Set the sttes_invalidated count to zero.
For each vm_stte linked to the window do:
A) Read the pid from the vm_stte's block.
B) If the vm_stte block is owned by this process, make a note of its address.
C) If the vm_stte block is not owned by this process call psignal to send a VM_INVALIDATE_STTE signal to the process indicating that it should invalidate the stte.
Call spin_unlock to unlock the window.
If this process has the window mapped call vm_stte_invalidate.
If the reference count is zero (no linked STTE's), call vm_window_swap_out_finish

VM WINDOW SWAP IN

The VM system executes the steps of the procedure VM_WINDOW_SWAP_IN to swap in a window as part of multiplexing SVA space. It is called by the scheduler. VM_WINDOW_SWAP_IN accepts as input a pointer to the window, and returns a status indication. A preferred sequence of steps of VM_WINDOW_SWAP_IN is set forth below.

Operation

Set status to VM_NORMAL.
all spin_lock to lock the selected window.
Check the window's state. If it is not swapped do:
A) Call spin_unlock to unlock the window.
B) Return the exception VM_WINDOW_NOT SWAPPED.
Change the window's state to active.
Allocate a range of SVA for the window.
Call spin_lock to lock vm_windows swapped.
Use VM_UNLINK_WINDOW to remove the window from vm_windows_swapped.
Call spin_unlock to unlock vm_windows_swapped.
Store the new SVA in the window entry.
Determine the active list for the window.
Call spin_lock to lock the active list.
Use VM_LINK_WINDOW to add the window to the active list.
Call spin_unlock to unlock the active_list.
Call wakeup on the window.procs_waiting if there are processes waiting.
For each vm_stte linked to the window do:
A) Read the pid from the vm_stte.
B) Call psignal to send a VM_REVALIDATE_STTE signal to the process owning the vm_stte.

VM_WINDOW_SWAP_OUT_FINISH

The VM system executes the steps of the procedure VM_WINDOW_SWAP_OUT_FINISH to complete the process of swapping out a window. It is called by the VM system. It accepts as input a pointer to the window, and returns a status indication.

A preferred sequence of steps of VM_WINDOW_SWAP_OUT_FINISH is set forth below.

Operation

Set status to VM_NORMAL.

Call vm_window_clean_pages to flush all resident pages of the window to their devices, while discarding the pages (and page notes) and preserving the atomic state information.

Call spin_lock to lock the active list for the window.

Set the window's state to swapped.

Use VM UNLINK_WINDOW to remove the window from the active_list.

Call spin_unlock to unlock the active_list.

Call spin_lock to lock vm_windows_swapped.

Use VM LINK_WINDOW to add the window to vm_windows_swapped.

Call spin_unlock to unlock vm_windows_swapped.

VM_OBJ_MAP

The VM system executes the steps of the procedure VM_OBJ_MAP to map a range of an object to a process. If the range is part of an existing window, then the window's count is incremented. If all or part of the range has not yet been mapped, then a new window is created. If a new window is created that encompasses an existing window, then the existing window is marked as being indirect, with all references transferred to the new window.

VM_OBJ_MAP accepts as input a pointer to the object, the object offset, the length, the vm_stte, the map_type, a boolean indicating whether atomic transactions are allowed, and the window access mode. It returns a pointer to the window, an stte_sva which might not be the same as the window's base SVA, and a status indicator.

A preferred sequence of steps of VM_OBJ_MAP is set forth below.

Operation

Set status to VM_NORMAL.

Call spin_lock to lock the object for exclusive access.

If the object's state is anything other than active, do:
A) Call spin_unlock to unlock the object
B) Return VM_OBJECT_DELETED or VM_OBJECT_CACHED, depending on the state.

If the object type does not match the requested type do:
A) Call spin_unlock to unlock the object.
B) Return the VM_OBJ_TYPE_INVALID exception.

Check if the range to be mapped in resides in any existing windows. If so, do
A) Call spin_unlock to unlock the object.
B) Call spin_lock to lock the window.
C) Increment the reference count.
D) Use VM_WINDOW_STTE_LINK to link the new vm_stte onto the last_stte.
E) If atomic_enabled is specified set the window's atomic_enabled flag.
F) Call spin_lock to lock the object.
G) Call spin_unlock to unlock the window.

If atomic_enabled was specified and an atomic state file does not exist for the object, call vm_atomic_state_file_create and store the vnode in the object entry.

Call spin_unlock to unlock the object.

Calculate the SVA that corresponds to the object offset specified, and return the value.

VM OBJ UNMAP

The VM system executes the steps of the procedure VM_OBJ_UNMAP to map out an object by decrementing a window's reference count. It is called by the VM system when a file is mapped out. VM_OBJ_UNMAP accepts as input an pointer to a vm_window and a pointer to a vm_stte. It returns a status indicator.

A preferred sequence of steps of VM_OBJ_UNMAP is set forth below.

Operation

Set status to VM NORMAL

Call spin_lock to lock the window for exclusive access.

Use VM_WINDOW_STTE_UNLINK to delink the specified vm_stte from the list of referencing vm_sttes.

Decrement the number of references for the window.

Call spin_unlock to unlock the window.

VM WIN GET ENTRY

The VM system executes the steps of the procedure VM_WIN_GET_ENTRY to allocate and initialize a new vm_window entry. It is called by the VM system when creating a new vm_window. The returns a pointer to a vm_window, along with a status indicator.

A preferred sequence of steps of VM_WIN_GET_ENTRY is set forth below.

Operation

Set status to VM_NORMAL

Call kern_malloc with no_wait specified.

If a vm_window entry is still needed do:
A) Call spin_lock to lock the cached window list.
B) If cached_list_num_windows is greater than 0 do:
   i) vm_window cached.first_window is the selected window.
   ii) Call spin_unlock to unlock the cached window list.
   iii) Call vm window_delete to delete the cached window.
   iv) Go back to the second step.
Otherwise (a vm_window entry is still needed) do:
   i) Call kern_malloc with wait specified.

Call spin_init to initialize the window's lock.

Set window.atomic_enabled to false.

Set procs_waiting, reference_count, sttes_invalidated and extension_count to zero.

Set indirect to NULL.

Set last_fault_addr, and run_length to zero.

Set low_addr_ref, high_addr_ref, low_addr_mod, high_addr_mod, lowaddr_atomic, and high_addr_atomic to zero.

Set num_pnb to zero.

Set first_pnb and last_pnb to NULL.

VM_WINDOW_STTE_LINK

The VM system executes the steps of the macro VM_WINDOW_STTE_LINK to link a vm_stte to a vm_window. It is called by the VM system when mapping a range of a file into a process's CA space. A preferred sequence of steps of VM_WINDOW_STTE_LINK is set forth below.

Operation

Set vm stte.prev_stte to window.last_stte.

Set vm stte.next_stte to NULL.
Set window.last_stte to this vm_stte.
If vm stte.prev_stte is NULL, set window.first-stte to this vm_stte. Otherwise, set the nextstte field of what used to be the last vm stte to point to this vm stte.
Increment window.reference_count.

Paging Routings

The digital data processing 10 and, particularly, the central processing units 40A-40C execute the steps contained in the procedures below, which form part of the VM system, to identify missing data and to page them in.

VM FAULT STTE MISS

Figure 18:
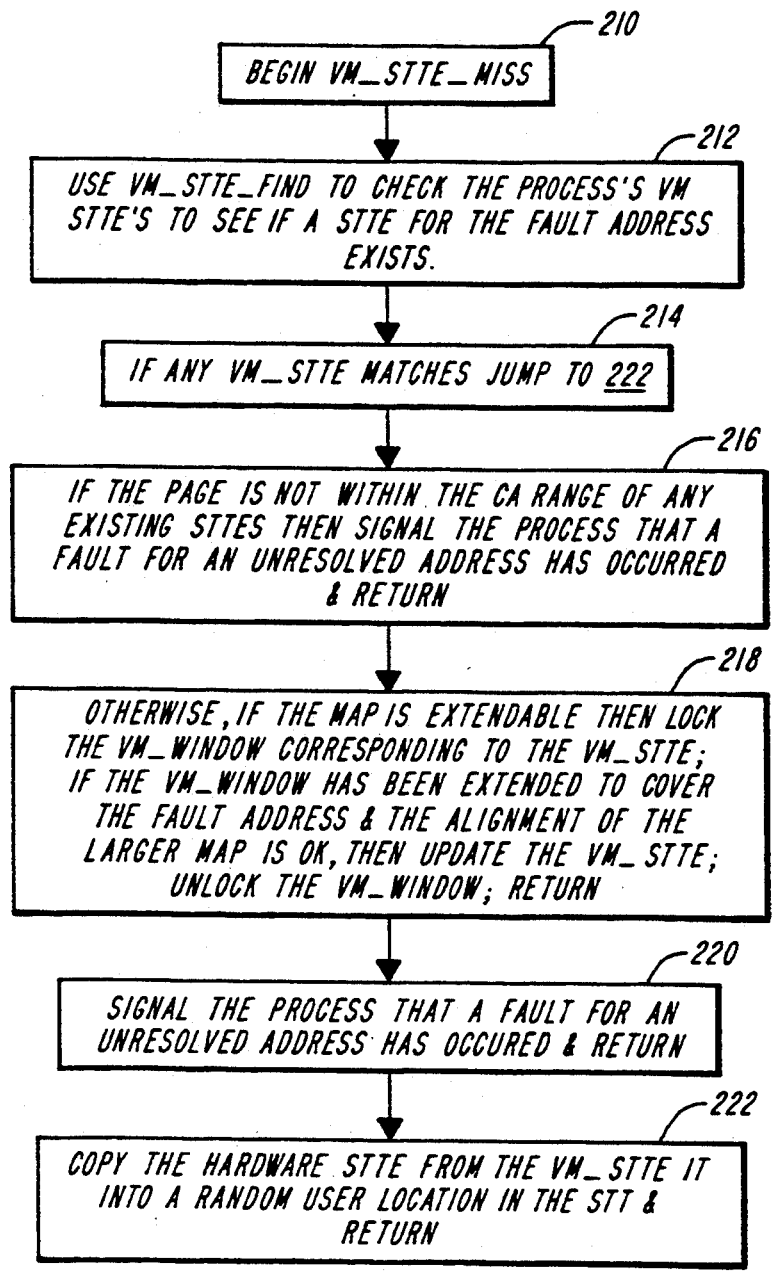
FIG. 18, Sheets 1–2, depict a preferred sequence of steps of VM_FAULT STTE MISS.

The VM system executes the steps of VM_FAULT_STTE_MISS to resolve a stte_mis fault by activating the appropriate vm_stte, updating and activating a vm_stte, or signalling the faulting processing that a fault for an unresolved address occurred. This procedure, which is only called from the trap handler, accepts as input the fault_address A preferred sequence of steps of VM_FAULT_STTE_MISS is set forth below and depicted in FIG. 18, beginning with step 210.

Operation

Use VM_STTE_FIND to check the process's vm_sttes to see if a STTE for the fault address exists (step 212).
If no vm_sttes match, then do
  A) If the page is NOT within the CA range of any existing STTEs then do:
    i) Signal the process that a fault for an unresolved address has occurred.
    ii) Return (step 216).
  B) Otherwise, if the map is extendable do:
    i) Lock the vm_window corresponding to the vm_stte.
    ii) If the vm_window has been to cover the fault address do:
      a) If the alignment of the larger map is ok (the current CA base is a natural boundary for the new size), update the vm stte. The updated vm_stte is now a match for the fault address.
    iii) Unlock the vm_window (step 218).
  C) Otherwise, Signal the process that a fault for an unresolved address has occurred (step 220).
If a vm_stte does match, use VMSTTE_LOAD to copy the hardware STTE from the vm stte it into a random user location (loop through user entries) in the STT (VM_ISTT_FIRST_USER to VM_ISTT_NUM_ENTRIES—1 in the ISTT, VM_DSTT_FIRST_USER to VM_DSTT_NUM_ENTRIES_—1 in the DSTT) (step 222).

VM PAGE IN

The VM system executes the steps of procedure VM_PAGE_IN to bring a page into the system in response to a page fault. It is called from the trap handler on read or write faults. The procedure accepts as input the fault address and a pointer to the vm_window.

VM_PAGE_IN must ensure that no process has access to the page being read until the I/O is complete. To do this, it issues the read request to a special page in the same line as the real page. When the I/O is complete, it changes the address of the page to the read address. If the page is backed by an overlay object, the data is copied from the backing page to the current page. To allow the copying of data, as documented below, text pages are not allowed to have backers.

Figure 19:
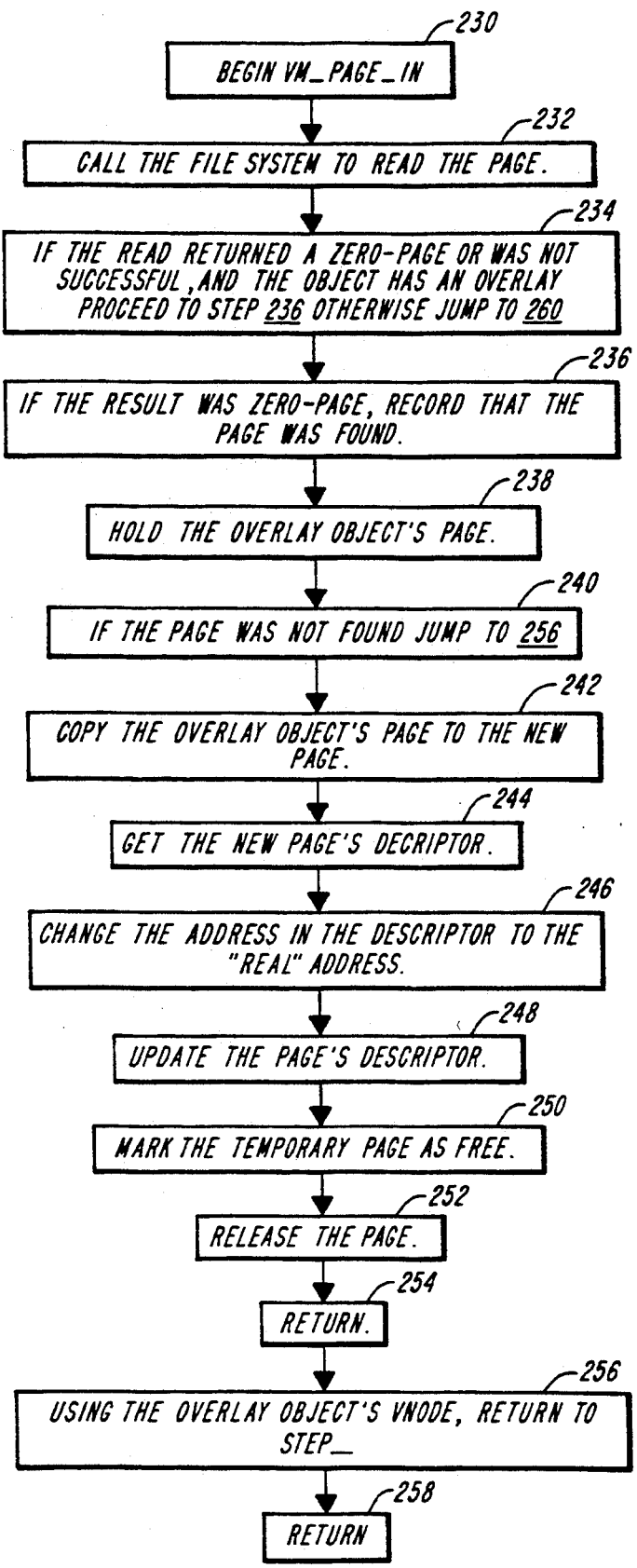

A preferred sequence of steps of VM_PAGE_IN is set forth below. A portion of that sequence is depicted in FIG. 19, beginning with step 230.

Operation

Lock the vm window.
If the vm_window's indirect address if not NULL, then:
  A) Unlock to vm_window.
  B) Call vm_obj_map to mapin the new vm_window.
  C) Call vm_obj_unmap to mapout the old vm_window.
  D) Return.
If the vm_window state is swapped or pending swapped (multiplexed) do:
  A) Increment window.procs_waiting.
  B) Call sleep_hard_rsp to unlock and wait on the vm_window.
  C) Return.
If the fault_address is less than window.low_addr_ref then set window.low_addr_ref to the fault address.
If the fault_address is greater than window.high_addr_ref then set window.high_addr_ref to the fault_address.
Use VM_PAGE_NOTE_GET to get the page_note (if one exists) for the fault_address.
If a NULL pointer was returned, no page note exits, so do:
  A) Use VM_PAGE_NOTE_CREATE to create a page note for the fault page.
If page_note.read_held or page_note.write_held are set do:
  A) Set page_note.procs_waiting.
  B) Call sleep_hard_rsp to unlock the vm_window and wait on the page note.
  C) Return.
Set page_note.read_held.
Use VM_PAGE_TO_LINE to determine in which line the fault page resides.
Call spin_lock to lock the object containing the vm_window.
Get the mapped_file's vnode from the object table.
Use VM_ADDR_TO_FILE_OFF to determine the file offset using the fault address and the object data.
Call spin_unlock to unlock the object entry.
Call spin-unlock to unlock the vmwindow.
Call vm_temp_page_create to get a temporary page to receive the data.
Call the File System to read the page. The File System must return the status of the I/O: successful, zero-page (not-on-disk), or not successful (step 232).
If the result was zero-page or not successful, and the object has an overlay do:
  A) If the result was zero-page, record that the page was found (step 236).
  B) Call vm_page_hold_for_write to hold the overlay object's page (step 238).
  C) If the page was found do:
    i) Copy the overlay object's page to the new page (step 242).
    ii) Use VM_PAGE_DESCR_READ to get the new page's descriptor (step 244).

iii) Change the address in the descriptor to the "real" address (step 246).

iv) Use VM_PAGE_DESCR_MOD to update the page's descriptor. This changes the page's address (step 248).

v) Mark the temporary page as free (step 250).

vi) Call vm_page_release to release the page (step 252).

vii) Return (step 254).

Otherwise, if the page was not found, do:

i) Using the overlay object's vnode, go back to the seventh step (calling the file system to read the page) (step 256).

SUMMARY

The foregoing describes an improved digital data processing system meeting the aforementioned objects. Particularly, it describes a digital data processing system that stores data accessed by a process within time intervals, e.g., between checkpoints or after a fork, within sets. Only data updated or accessed during an interval is stored in the associated set. That accessed only during prior intervals remains in the sets associated with those intervals. Those skilled in the art will appreciate that the embodiments described above are exemplary only, and that other apparatuses and methods—including modifications, additions and deletions—fall within the scope and spirit of the invention.

By way of example, it will be appreciated that differing data structures may be used for managing and translating the CA and SVA spaces. That equivalent, but varied, procedures may be used to transfer information between the objects. And, by way of further example, that the sequence of the at least certain ones of the object, window and STT management routines may be varied without changing the spirit of the invention.

In view of the foregoing, what we claim is:

1. A digital data processing apparatus comprising:
   A. memory means for storing data,
   B. first process means for executing a first process and for generating in connection therewith at least one request for mapped access to said data,
   C. fork/checkpoint signalling means for generating one or more new-process signals, each new-process signal delineating a successive process interval,
      the interval preceding the first new-process signal being referred to as the first interval,
   D. means for responding to a request for access to a datum generated by the first process during said first interval for providing access to the requested datum as stored in a first set of data stored in said memory means,
      the first set being referred to as associated with said first interval of the first process,
   E. first address space management means, coupled to said first process means and to said fork/checkpoint signalling means, for responding at least to an initial request by that process during a current interval subsequent to said first interval for write-type access to a datum, for
      i) accessing the requested datum as stored in a set associated with a prior interval of the first process, and
      ii) generating a further datum initially identical to that accessed datum;
   F. said first address space management means including means for storing said initially identical datum in a set in said memory means associated with the current interval of the first process, and
   G. said first address space management means further including means responsive to said initial request by the first process during said current interval for at least write-type access to a datum, as well as to subsequent requests for any of read-type and write-type access to that same datum by that same process during that same interval, for accessing said initially identical datum as stored in the set associated with the current interval of the first process, and otherwise for accessing the requested datum as stored in a set associated with a prior interval of the first process.

2. An apparatus according to claim 1 wherein
   A. at least said first address space management means includes copy-on-reference-after-first-write means for generating said further initially identical datum in response to at least an initial request by said first process during said current interval for write-type access to a datum, as well as to any subsequent request during that same interval for any of read-type and write-type access to any datum,
   B. said first address space management means includes means responsive to said initial request by said first process during said current interval for write-type access to a datum, as well as to said subsequent requests during that same interval for any of read-type and write-type access to any datum, for accessing said initially identical datum as stored in the set associated with the current interval of the first process, and otherwise for accessing the requested datum as stored in a set associated with a prior interval of the first process.

3. An apparatus according to claim 1, wherein
   A. each said datum in said memory means is associated with a storage descriptor,
   B. each said process means includes means for generating, along with said access request, a context address signal associated with the requested datum,
   C. at least said first address space management means includes address translation means responsive to a context address signal for generating a storage descriptor associated with that same datum as stored in the set associated with the current interval of the associated process, and
   D. said memory means includes means responsive to such storage descriptor for providing access to the associated datum.

4. An apparatus according to claim 3, wherein said address translation means includes one or more translation-representative signals, each representative of an association between at least one context address signal and at least one storage descriptor.

5. An apparatus according to claim 4, wherein at least said first address space management means includes
   A. object means for selectively storing signals representative of a state of the associated process during a process interval, said state-representative signals including said translation-representative signals, and
   B. means for selectively transferring such translation-representative signals between said object means and said address translation means.

6. An apparatus according to claim 5, wherein at least said first address space management means includes means responsive to at least said new-process signal for at least enabling storage of said translation-representative signals from said address translation means to said object means.

7. An apparatus according to claim 6, wherein said first address space management means includes means responsive to an initial request by the first process for write-type access to a datum subsequent to said new-process signal for storing said translation-representative signals from said address translation means to said object means.

8. An apparatus according to claim 6, wherein at least said first address space management means includes means for creating a plurality of said object means, each storing translation-representative signals from the address translation means of a respective prior interval.

9. An apparatus according to claim 8, wherein at least said first address space management means includes means linking said object means in an order based upon the recency of the associated process intervals.

10. An apparatus according to any of claims 5-9, wherein at least said first address space management means includes reassignment means responsive to said new-process signal for at least enabling modification of said one or more translation-representative signals stored in said address translation means to reflect an association between at least one context address signal and at least one further storage descriptor, said further storage descriptor being initially associated with a missing datum in a set associated with the current interval of the associated process.

11. An apparatus according to claim 10, wherein said reassignment means includes means for responding to an initial request by the first process for write-type access to a datum subsequent to said new-process signal for so modifying said one or more translation-representative signals stored in said address translation means.

12. An apparatus according to claim 10, wherein said memory means includes means responsive to a request for access to a missing datum for generating a missing-datum signal indicative thereof.

13. An apparatus according to claim 12, wherein at least said first address space management means includes prior-set means responsive to a missing-datum signal for accessing the missing datum as stored in a set associated with a prior interval of the associated process.

14. An apparatus according to claim 13, wherein said prior-set means includes means for accessing the missing datum as stored in a set associated with a most recent prior interval of the associated process in which that datum is stored.

15. An apparatus according to claim 14, wherein said prior-set means includes means for searching one or more said object means to identify a storage descriptor associated with said missing datum.

16. An apparatus according to claim 15, wherein at least said first address space management means includes restore means for restoring the associated process to a state associated with a prior process interval.

17. An apparatus according to claim 16, wherein said restore means includes means for transferring translation-representative signals from a selected one of said object means to said address translation means.

18. An apparatus according to claim 5, further comprising
A. disk means coupled to said address space management means for non-volatile storage of data, and wherein B. said first address space means includes means for storing and accessing said object means on said disk means.

19. An apparatus according to claim 18, comprising
A. means for temporarily storing at least selected other process-related information on said disk means,
B. means for retaining at least selected object means on said disk for periods longer then said other process-related information.

20. A digital data processor according to claim 1, comprising:
A. fork means for creating a second process initially duplicating said first process,
  said fork means being coupled to said fork/checkpoint signalling means for initiating generation of a new-process signal in connection with creation of said second process,
B. second process means for executing said second process and for generating in connection therewith at least one request for mapped access to said datum,
C. second address space management means coupled to said second process means for responding at least to an initial request by that process during a current interval subsequent to creation of said second process for write-type access to a datum, for
  i) accessing the requested datum as stored in a set associated with at least a prior interval, preferentially associated with the second process, and
  ii) generating a further datum initially identical to the access datum,
D. said second address space management means including means for storing that initially identical datum in a set in said memory means associated with the current interval of the second process, and
E. said second address space management means further including means responsive to said initial request by the second process during said current interval for at least write-type access to a datum, as well as to subsequent requests for any of read-type and write-type access to that same datum by that same process during the current interval for accessing said initially identical datum as stored in the set associated with the current interval of the second process, and otherwise for accessing that datum as stored in a set associated with a prior interval, preferentially associated with said second process.

21. An apparatus according to claim 1, comprising at least one of:
A. automatic checkpoint means responsive to a designated event for generating a new-process signal,
B. manual checkpoint means responsive to operator input for generating a new-process signal, and
C. programmatic checkpoint means responsive to execution of at least a selected programming instruction for generating a new-process signal.

22. An apparatus according to claim 21, wherein said automatic checkpoint means include means for generating said one or more new-process signals as a function of time.

23. A method for operating a digital data processing apparatus comprising the steps of:
A. providing memory means for storing data,
B. executing a first process and generating in connection therewith at least one request for mapped access to said data, C. generating one or more new-process signals, each new-process signal delineating a successive process interval,
the interval preceding the first new-process signal being referred to as the first interval, D. responding to a request for access to a datum generated by the first process during said first interval for providing access to the requested datum as stored in a first set of data stored in said memory means,
the first set being referred to as associated with said first interval of the first process, E. responding at least to an initial request by said first process during a current interval subsequent to said first interval for write-type access to a datum, for
  i) accessing the requested datum as stored in a set associated with a prior interval of the first process, and
  ii) generating a further datum initially identical to that accessed datum, F. storing said initially identical datum in a set in said memory means associated with the current interval of the first process, and G. responding to said initial request by the first process during said current interval for at least write-type access to a datum, as well as to subsequent requests for any of read-type and write-type access to that same datum by that same process during that same interval, for accessing said initially identical datum as stored in the set associated with the current interval of the first process, and otherwise for accessing the requested datum as stored in a set associated with a prior interval of the first process.

24. A method according to claim 23 comprising the further steps of
A. generating said further initially identical datum in response to at least an initial request by said first process during said current interval for write-type access to a datum, as well as to any subsequent request during that same interval for any of read-type and write-type access to any datum,
B. responding to said initial request by said first process during said current interval for write-type access to a datum, as well as to said subsequent requests during that same interval for any of read-type and write-type access to any datum, for accessing said initially identical datum as stored in the set associated with the current interval of the first process, and otherwise for accessing the requested datum as stored in a set associated with a prior interval of the first process.

25. A method according to claim 23, wherein
A. each said datum in said memory means is associated with a storage descriptor,
B. each said process generates, along with said access request, a context address signal associated with the requested datum, said method comprising the further steps of
C. responding to a context address signal for generating a storage descriptor associated with that same datum as stored in the set associated with the current interval of the associated process, and
D. responding to such storage descriptor for providing access to the associated datum.

26. A method according to claim 25, comprising the step of providing one or more translation-representative signals, each representative of an association between at least one context address signal and at least one storage descriptor.

27. A method according to claim 26, comprising the steps of
A. selectively storing signals representative of a state of the associated process during a process interval, said state-representative signals including said translation-representative signals, and
B. selectively transferring such translation-representative signals between said object means and said address translation means.

28. A method according to claim 27, comprising the steps of responding to at least said new-process signal for at least enabling storage of said translation-representative signals from said address translation means to said object means.

29. A method according to claim 28, comprising the step of responding to an initial request by the first process for write-type access to a datum subsequent to said new-process signal for storing said translation-representative signals from said address translation means to said object means.

30. A method according to claim 28, comprising the step of creating a plurality of said object means, each storing translation-representative signals from the address translation means of a respective prior interval.

31. A method according to claim 30, comprising the step of linking said object means in an order based upon the recency of the associated process intervals.

32. A method according to any of claims 27-31, comprising the step of responding to said new-process signal for at least enabling modification of said one or more translation-representative signals stored in said address translation means to reflect an association between at least one context address signal and at least one further storage descriptor, said further storage descriptor being initially associated with a missing datum in a set associated with the current interval of the associated process.

33. A method according to claim 32, comprising the step of responding to an initial request by the first process for write-type access to datum subsequent to said new-process signal for so modifying said one or more translation-representative signals stored in said address translation means.

34. A method according to claim 32, comprising the step of responding to a request for access to a missing datum for generating a missing-datum signal indicative thereof.

35. A method according to claim 34, comprising the step of responding to a missing-datum signal for accessing the missing datum as stored in a set associated with a prior interval of the associated process.

36. A method according to claim 35, comprising the step of accessing the missing datum as stored in a set associated with a most recent prior interval of the associated process in which that datum is stored.

37. A method according to claim 36, comprising the step of searching one or more said object means to identify a storage descriptor associated with said missing datum.

38. A method according to claim 37, comprising the step of restoring the associated process to a state associated with a prior process interval.

39. A method according to claim 38, comprising the step of transferring translation-representative signals from a selected one of said object means to said address translation means.

40. A method according to claim 27, further comprising the steps of
   A. providing disk means for non-volatile storage of data, and
   B. storing and accessing said object means on said disk means.

41. A method according to claim 40, comprising the step of
   A. temporarily storing at least selected other process-related information on said disk means,
   B. retaining at least selected object means on said disk for periods longer then said other process-related information.

42. A method according to claim 23, comprising the steps of:
   A. creating a second process initially duplicating said first process, and initiating generation of a new-process signal in connection with creation of said second process,
   B. executing said second process and generating in connection therewith at least one request for mapped access to said datum,
   C. responding at least to an initial request by said second process during a current interval subsequent to creation of said second process for write-type access to a datum, for
      i) accessing the requested datum as stored in a set associated with at least a prior interval, preferentially associated with the second process, and
      ii) generating a further datum initially identical to the access datum,
   D. storing that initially identical datum in a set in said memory means associated with the current interval of the second process, and
   E. responding to said initial request by the second process during said current interval for at least write-type access to a datum, as well as to subsequent requests for any of read-type and write-type access to that same datum by that same process during the current interval for accessing said initially identical datum as stored in the set associated with the current interval of the second process, and otherwise for accessing that datum as stored in a set associated with a prior interval, preferentially associated with said second process.

43. A method according to claim 23, including the step of executing at least one of the following operations:
   A. responding to a designated event for generating a new-process signal,
   B. responding to operator input for generating a new-process signal, and
   C. responding to execution of at least a selected programming instruction for generating a new-process signal.

44. A method according to claim 23, comprising the step of generating said one of more new-process signals as a function of time.

* * * * *